US010275891B2

(12) United States Patent
Jalali et al.

(10) Patent No.: US 10,275,891 B2
(45) Date of Patent: Apr. 30, 2019

(54) PHASE TRANSFORM FOR OBJECT AND SHAPE DETECTION IN DIGITAL IMAGES

(71) Applicant: THE REGENTS OF THE UNIVERSITY OF CALIFORNIA, Oakland, CA (US)

(72) Inventors: Bahram Jalali, Los Angeles, CA (US); Mohammadhossein Asghari, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 15/341,789

(22) Filed: Nov. 2, 2016

(65) Prior Publication Data

US 2017/0140545 A1    May 18, 2017

Related U.S. Application Data

(63) Continuation of application No. PCT/US2015/029319, filed on May 5, 2015.
(Continued)

(51) Int. Cl.
*G06T 7/168* (2017.01)
*G06T 7/13* (2017.01)

(52) U.S. Cl.
CPC ............... *G06T 7/168* (2017.01); *G06T 7/13* (2017.01); *G06T 2207/10024* (2013.01);
(Continued)

(58) Field of Classification Search
CPC . G06T 7/168; G06T 7/13; G06T 2207/20048; G06T 2207/20052; G06T 2207/20056
See application file for complete search history.

(56) References Cited

U.S. PATENT DOCUMENTS

2006/0291707 A1   12/2006   Kothapalli et al.
2010/0172558 A1*   7/2010   San Jose Estepar ......................
                                                    G06T 11/006
                                                    382/131
(Continued)

FOREIGN PATENT DOCUMENTS

JP         11-096354 A       4/1999
KR    10-2009-0037704 A      4/2009
WO       2015171661 A1      11/2015

OTHER PUBLICATIONS

Wikipedia, "Convolution theorem" [online], 2013 [retrieved on Jan. 24, 2018]. Retrieved from the Internet: <URL: https://web.archive.org/web/20130429230149/https://en.wikipedia.org/wiki/Convolution_theorem >, 2 pages.*

(Continued)

*Primary Examiner* — David F Dunphy
(74) *Attorney, Agent, or Firm* — KPPB LLP

(57) ABSTRACT

Object and shape detection in digital images utilizing edge detection is described. In a first edge detection approach, phase transformation is utilized in the frequency domain, such as in response to Fourier transform, followed by use of a frequency-domain phase kernel and inverse-Fourier transform. Edge detection is also provided using a phase transform in the spatial domain utilizing a convolution approach. In a second edge detection approach, phase stretching is utilized, such as in combination with phase histogramming along with thresholding and morphological operations. Numerous example images are provided illustrating benefits of the disclosed technology with different applications and under different conditions.

10 Claims, 35 Drawing Sheets

Related U.S. Application Data

(60) Provisional application No. 61/988,501, filed on May 5, 2014, provisional application No. 62/014,262, filed on Jun. 19, 2014.

(52) U.S. Cl.
CPC .............. *G06T 2207/10056* (2013.01); *G06T 2207/20036* (2013.01); *G06T 2207/20056* (2013.01)

(56) References Cited

U.S. PATENT DOCUMENTS

2011/0142301 A1  6/2011  Boroczky et al.
2012/0275676 A1  11/2012  Haacke

OTHER PUBLICATIONS mathmistakes.info, "Common Types of Mistakes: Incorrectly Assuming Linearity" [online], 2018 [retrieved on 2018-01-23]. Retrieved from the Internet: <URL: http://www.mathmistakes.info/facts/AlgebraFacts/learn/ctm/nlin.html>, 3 pages.*
Korean Intellectual Property Office (KIPO), International Search Report and Written Opinion, issued Jul. 30, 2015, related PCT International Patent Application No. PCT/US2015/029319, pp. 1-18, with claims searched, pp. 9-28.
International Preliminary Report on Patentability for International Application PCT/US2015/029319, Report dated Nov. 8, 2016, dated Nov. 17, 2016, 14 Pgs.
Asghari et al., "Discrete Anamorphic Transform for Image Compression", IEEE Signal Processing Letters, Jul. 2014, vol. 21, No. 7, pp. 829-833.
Asghari et al., "Edge Detection in Digital Images Using Dispersive Phase Stretch Transform", International Journal of Biomedical Imaging, Apr. 2015, vol. 2015, Article 687819, 6 pgs.
Asghari et al., "Image Compression Using the Anamorphic Stretch Transform", 13th IEEE International Symposium on Signal Processing and Information Technology (ISSPIT 2013), Date of Conference: Dec. 12-15, 2013, Athens, Greece.
Asghari et al., "Physics-inspired image edge detection", 2014 IEEE Global Conference on Signal and Information Processing (GlobalSIP), Date of Conference: Dec. 3-5, 2014, Atlanta, GA, 4 pgs.
Canny, J., "A Computational Approach to Edge Detection", IEEE Trans. Pattern Analysis and Machine Intelligence, 1986, vol. 8, pp. 679-698.
Marr et al., "Theory of edge detection", Proceeding of the Royal Society of London, B, Feb. 29, 1980, vol. 207, pp. 187-217.
Perona et al., "Scale-Space and Edge Detection Using Anisotropic Diffusion", IEEE Transactions on Pattern Analysis and Machine Intelligence, 1990, vol. 12, No. 7, pp. 629-639.
Ziou et al., "Edge detection techniques: An overview", International Journal of Pattern Recognition and Image Analysis, 1998, vol. 8, pp. 537-559.

* cited by examiner

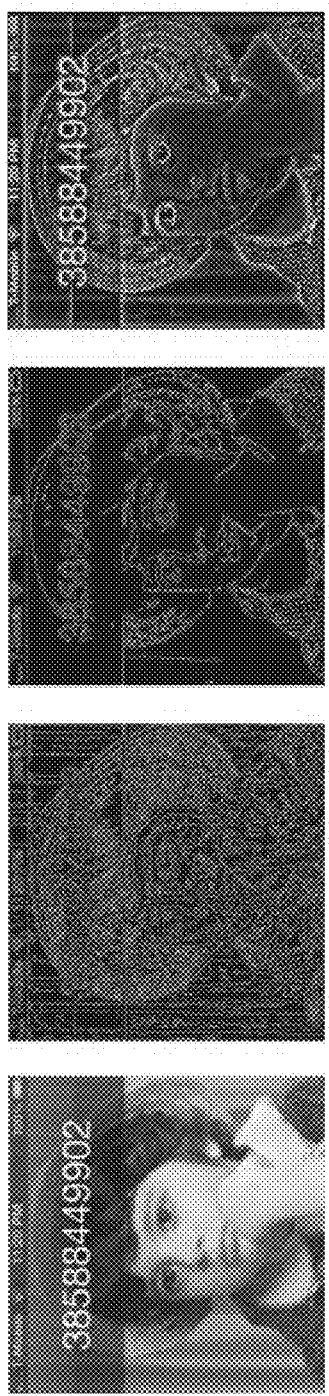

PHASE TRANSFORM FOR OBJECT AND SHAPE DETECTION IN DIGITAL IMAGES

CROSS-REFERENCE TO RELATED APPLICATIONS

This application is a 35 U.S.C. § 111(a) continuation of PCT international application number PCT/US2015/029319 filed on May 5, 2015, incorporated herein by reference in its entirety, which claims priority to, and the benefit of, U.S. provisional patent application Ser. No. 61/988,501 filed on May 5, 2014, incorporated herein by reference in its entirety, and which claims priority to, and the benefit of, U.S. provisional patent application Ser. No. 62/014,262 filed on Jun. 19, 2014, incorporated herein by reference in its entirety. Priority is claimed to each of the foregoing applications.

The above-referenced PCT international application was published as PCT International Publication No. WO 2015/171661 on Nov. 12, 2015, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technological Field

This disclosure pertains generally to image processing, and more particularly to image processing utilizing a phase transform with an output phase image for edge detection.

2. Background Discussion

Exponential growth in the amount of digital data generated by sensors and computers has resulted in a technological problem called "Big Data" bottleneck. One of the most problematic issues when working with Big Data is to analyze and make sense out of the huge amount of the flooding data. In past decades, many computer vision methods, such as edge detection, object recognition and machine learning algorithms have been developed for Big Data handling.

Edge detection is the name for a set of mathematical methods for identifying patterns in a digital image where brightness or color changes abruptly. Applying an edge detection process to an image is the basis for numerous forms of object detection, shape, classification, movement detection, and so forth. Edge detection also reduces the digital file size while preserving important information, albeit data compression is not the main objective in edge detection.

There are many methods for edge detection, but most of them can be grouped into two categories, search-based and zero-crossing based. The search-based methods detect edges by first computing a measure of edge strength, usually a first-order derivative, and then searching for local directional maxima of the gradient magnitude. The zero-crossing based methods search for zero crossings in a second-order derivative computed from the image.

Sobel operator is one of the earliest advanced methods developed for edge detection. It is a discrete differentiation operator performed at each point in the image, the result of the Sobel operator is either the corresponding gradient vector or the norm of this vector. The gradient approximation that is produced is relatively crude, in particular for high frequency variations in the image.

Other edge detection methods, such as Canny, Prewitt, Roberts, Log and Zero cross exist for computer vision applications. The Canny edge detector, considered as state-of-the-art, uses a multi-stage algorithm to detect edges in an image. Canny uses the calculus of variations toward optimizing a given function. The optimal function is described by the sum of four exponential terms, however, it can be approximated by the first derivative of a Gaussian.

However, even the most advanced Canny edge detection approach suffers from a number of shortcomings that limit its ability for discerning edges and objects under the best conditions, and whose results degrade significantly under adverse image situations and conditions.

Accordingly, a need exists for new edge detection apparatus and methods which provide enhanced edge detection abilities which can be utilized in wide range of conditions. The present disclosure fulfill those needs and others, while overcoming other shortcomings of existing methods.

BRIEF SUMMARY

Two different forms of edge detection in an image(s) under analysis are disclosed. In a first approach, the image under analysis is passed through a Phase Transformation and the output phase image is optionally Post-Processed to generate an image of the edges. Phase Transformation can be performed according to the disclosure by operating either in the frequency domain or spatial domains. Image results are included which illustrate that the disclosed method is an improvement over Canny edge detection method in terms of edge detection performance and simplicity.

In a second edge detection method a new computational approach to edge detection is described, which in some ways emulates propagation of light through a physical medium with specific diffractive property and uses the resulting phase to identify edges in a digital image. This method is not iterative and does not require prior knowledge about the image, and describes an edge detection process which is more general, including its use of pre-processing and use of a localization kernel in detecting edges.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

FIG. 12A through FIG. 12D are images (child image) depicting comparisons between an original image containing impairment using two different Canny methods, as compared with edge detection according to an embodiment of the present disclosure.

FIG. 13A through FIG. 13C are images (street in fog) depicting comparisons between an original image and a Canny method as compared with edge detection according to an embodiment of the present disclosure.

DETAILED DESCRIPTION

Figure 1:
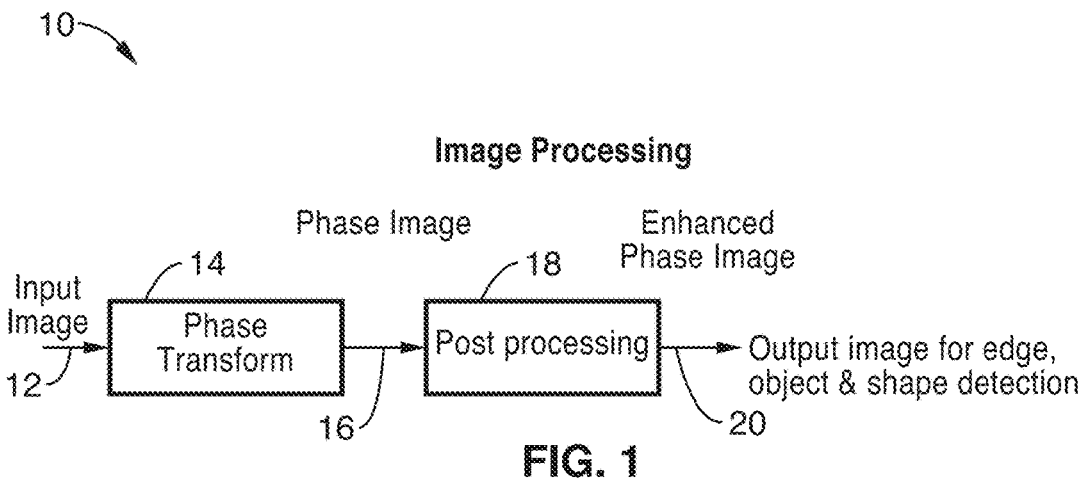
FIG. 1 is a block diagram of image processing utilizing the disclosed phase transform in combination with optional post processing for object and shape detection according to an embodiment of the present disclosure.

1. Phase Transforms for Image Edge Detection

In the disclosed method for edge detection, the image under analysis is passed through a Phase Transformation and the output phase image is Post-Processed to generate an image of the edges. Phase Transformation can be performed according to the disclosure by operating either in the frequency domain or spatial domains. The Phase Transformation in the frequency domain can be described as follows:

$$\angle \tilde{B}[n,m] = \text{Angle}\left\langle \text{IFT}\{\tilde{K}[p,q] \cdot \text{FT}\{B[n,m]\}\} \right\rangle \quad (1)$$

where $B[n,m]$ is the image under analysis, $\angle \tilde{B}[n,m]$ is the output phase image, n and m are two dimensional spatial variables, Angle< > is the angle operator, FT is the Fourier transform, IFT is the inverse Fourier transform and p and q are two dimensional frequency variables. It should be appreciated that other transforms which can decompose the frequency components of a source signal/image may be utilized in place of the Fourier operation, including but not limited to: Fast Fourier Transform (FFT), Discrete Fourier Transform (DFT), Discrete Sine Transform and Discrete Cosine transforms. The Phase Kernel $\tilde{K}[p,q]$ is described by a nonlinear phase operation:

$$\tilde{K}[p,q] = e^{j \cdot \varphi[p,q]}. \quad (2)$$

In general, the Phase Kernel $\tilde{K}[p,q]$ can have a number of shapes, or phase profiles. The general requirement is that the phase must be an even function of frequency, for example, a quadratic function, a 4$^{th}$ order dependence or other functions with even symmetry about a center frequency can be utilized. Center frequency is the zero frequency in the case of conventional images. Equivalently, the derivative of phase profile φ[p,q], called Phase Derivative PD[p,q]=∂φ [p,q]/∂p·∂q), should be an odd function with respect to p and q. Phase Derivative is also known as group delay in analogy to the same parameter applied to temporal signals. A linear group delay can be used. Alternatively, one of the simplest (e.g., least number of parameters) yet effective of profiles is the inverse tangent function:

$$PD[p,q]=a_1 \cdot \tan^{-1}(b_1 \cdot p)+a_2 \cdot \tan^{-1}(b_2 \cdot q), \quad (3)$$

where $\tan^{-1}$ is the inverse tangent function and a1, b1, a2 and b2 are real-valued numbers. The total amount of phase φ[p,q] determines the sharpness of the image edges that will be extracted.

The Phase Transformation in the spatial domain can be described as follows:

$$\overset{\angle}{B}[n,m] = \text{Angle}\left(\sum_{k_1,k_2=-\infty}^{\infty} K[n-k_1, m-k_2] \cdot B[k_1, k_2]\right) \quad (4)$$

where the phase Kernel in the spatial domain, K[n,m], is described by a nonlinear phase operation:

$$K[n,m]=e^{j \cdot \Phi[n,m]}. \quad (5)$$

The Phase Kernel K[n,m] in spatial domain is the Fourier transform of the Kernel in frequency domain described above. The derivative of phase profile in spatial domain Φ[n,m], can be expressed in terms of its spatial derivative, called Local Frequency LF[n,m]=∂Φ[n,m]/(∂n·∂m). One of the simplest (e.g., least number of parameters) yet effective profile is the tangent function:

$$LF[n,m]=a_1 \cdot \tan(b_1 \cdot n)+a_2 \cdot \tan(b_2 \cdot m), \quad (6)$$

where tan is the tangent function a1, b1, a2 and b2 are real-valued numbers. The total amount of phase Φ[n,m] determines the sharpness of the image edges that will be extracted. It should be appreciated, however, that other profiles can be utilized without departing from the present disclosure.

The Phase Transformation generates the phase image $\overset{\angle}{B}[n,m]$ which is further post processed. For edge detection, post-processing in at least one embodiment includes, generating the histogram of phase image $\overset{\angle}{B}[n,m]$, and performing one or more thresholding steps and morphological operations. The histogram shows the density of different edges in the image on which thresholding is applied. Thresholding is utilized to distinguish between different kinds of edges, for example softer or sharper edges. Morphological operations can be utilized as desired to thin the edges, clean the phase image by removing the isolated pixels, to find prime lines representing edges, or find image corners (points of interest). In at least one embodiment, the morphological operations are applied to the phase output (preferably generated in response to pre-filtering, phase-transform, and thresholding), using the technique of non-maximum suppression. In at least one embodiment, the morphological operation is configured with hysteresis thresholding for rejecting isolated artifacts that may be otherwise seen at the edges of the image. In at least one embodiment, a Scale Invariant Feature Transform (SIFT) is applied to the output, preferably following the morphological operation. It will be appreciated that various morphological operations are known, and can be found in the Morphological Operations toolbox in MATLAB software.

FIG. 1 illustrates an example embodiment 10 of the disclosed Phase Transform for image processing. The image 12 is passed through a Phase Transformation 14 which generates an output phase image 16. The resulting phase image is then further Post Processed 18 to extract the desired information 20, such as edges and shapes.

Figure 2:
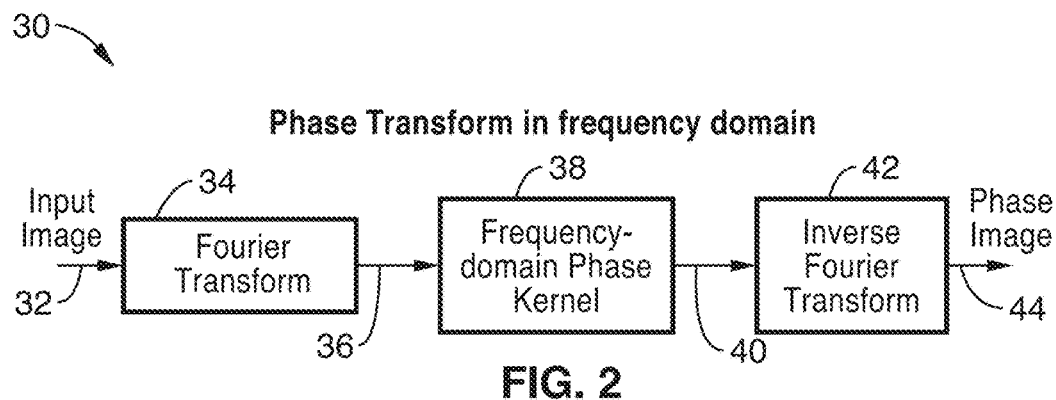
FIG. 2 is a block diagram of performing a phase transform in the frequency domain according to an embodiment of the present disclosure.

FIG. 2 illustrates an example embodiment 30 of a Phase Transform implemented in the frequency domain. The spatial image 32 is converted into frequency domain via Fourier transform 34 and the output 36 is then multiplied 38 by the Phase Kernel. Output 40 from the phase kernel is then passed through an inverse Fourier Transform 42 to obtain the transform of the image back to a spatial domain. The output of Phase Transform is the phase 44, that is to say it is the angle of the spatial image.

Figure 3:
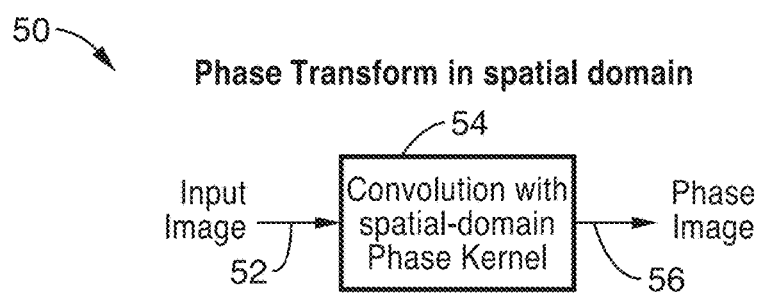
FIG. 3 is a block diagram of performing a phase transform in the spatial domain according to an embodiment of the present disclosure.

FIG. 3 illustrates an example embodiment 50 of a Phase Transform implemented in the spatial domain. In this implementation, the image 52 is convolved with a spatial Phase Kernel 54. The output 56 of the Phase Transform is the angle of the spatial image.

Figure 4:
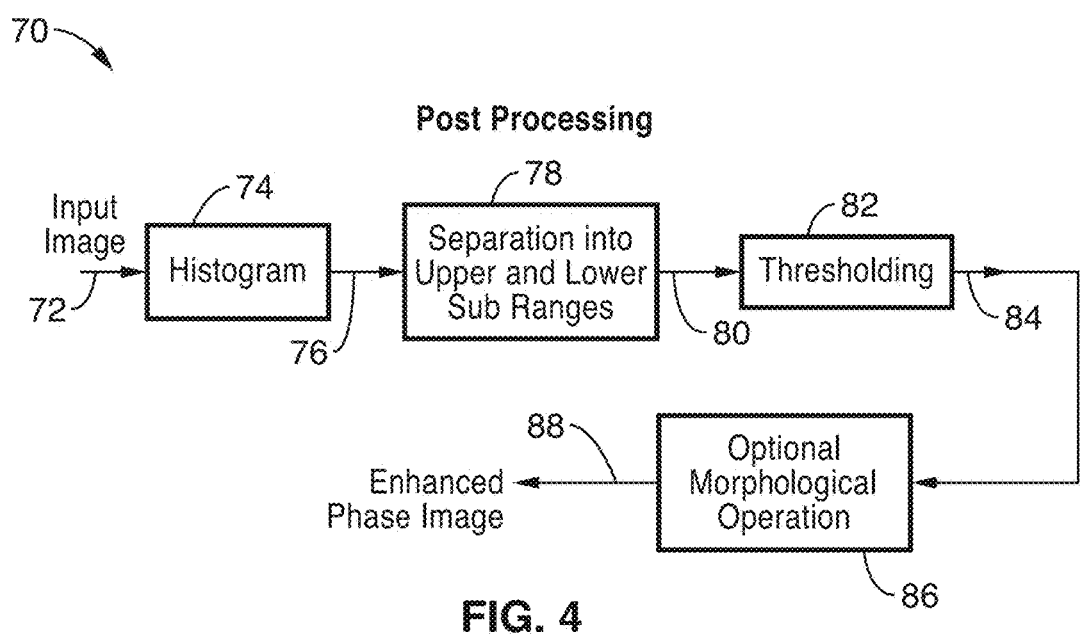
FIG. 4 is a block diagram of post processing steps according to an embodiment of the present disclosure.

FIG. 4 illustrates an example embodiment 70 of Post Processing stages used after the Phase Transform. The phase image 72 is received with a histogram stage 74 generating a histogram 76 of phase image which is then separated 78 into ranges of density of different edges in the image. Next the output 80, after separating into ranges, is passed through a thresholding process 82 which is used to distinguish between different kinds of edges, for example softer or sharper edges, which in general can be a binary thresholding or multi-level thresholding depending on the application. Output 84 from thresholding can be optionally processed utilizing morphological operations 86, such as to thin the edge lines, clean the edge image by removing the isolated pixels, or to find prime lines representing the edges, prior to outputting an enhanced phase image 88. A list of common morphological operations that can be used in the Post Processing stage of our technology can be found in Morphological Operations toolbox in MATLAB software.

Figure 5:
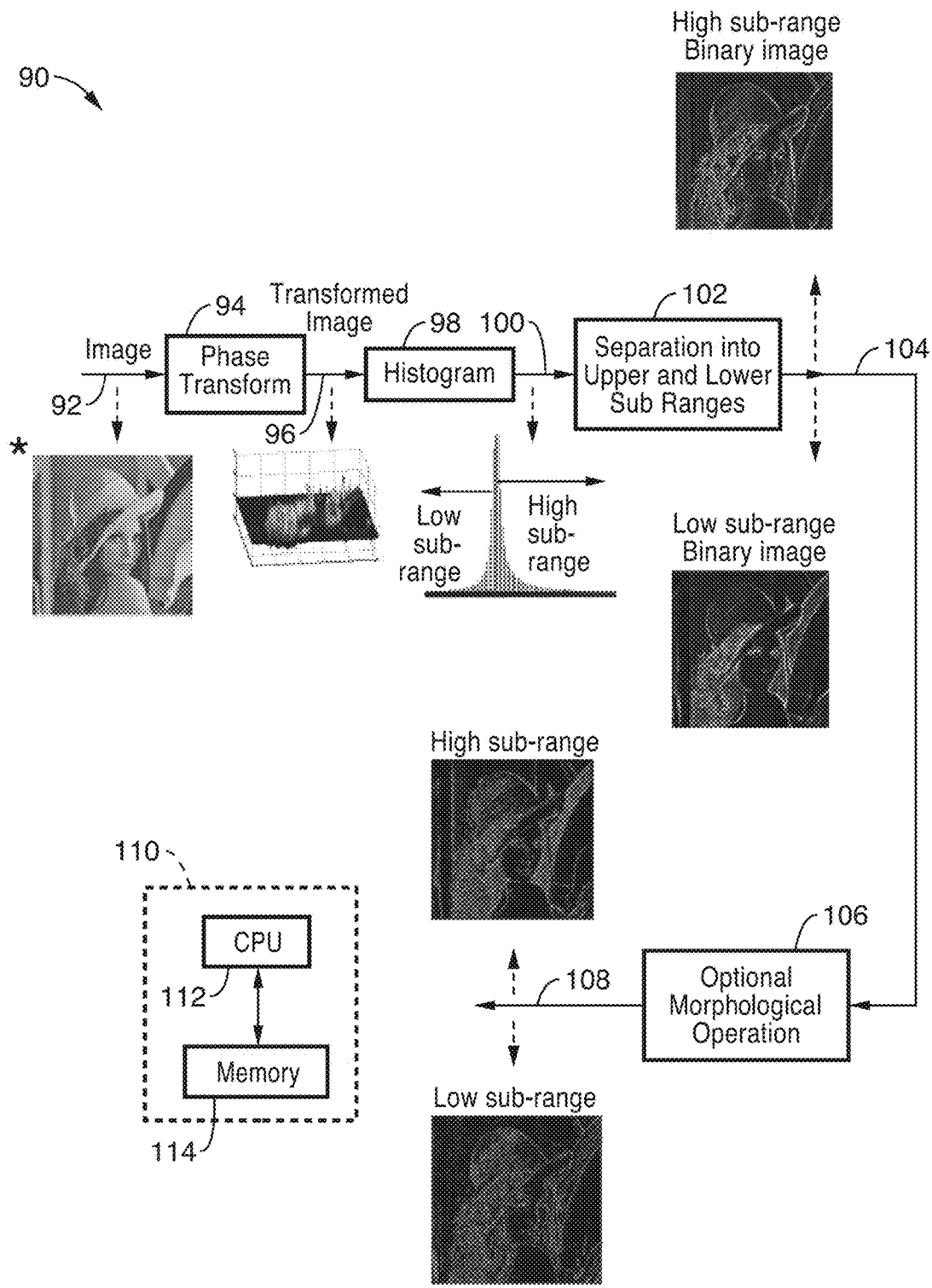
FIG. 5 is a block diagram of performing object and shape detection utilizing a phase transform in the frequency domain according to an embodiment of the present disclosure.

FIG. 5 illustrates an example embodiment 90 of Phase Transform and Post Processing stages used after Phase Transform stage. This figure depicts these operations in processing the "Lena" image at each stage. An image 92 is received at a phase transform block 94 outputting a transformed image 96, which is histogram processed 98 to output 100 a histogram with high and low sub-ranges. The histogram is then input to a block 102 for separating the image itself into upper and lower subranges 104, with these images shown in the figure. After this processing, optional morphological operations 106 can be performed to provide the output images 108 in the high and low sub-ranges.

The above steps are preferably performed on an image processing apparatus or system, such as having computer processing functionality 110, having at least one computer processor (CPU) 112 and at least one memory 114 configured for retaining program data and instructions for execution on processor 112 for carrying out the method steps depicted throughout this disclosure. It should be appreciated that only for the sake of simplicity of illustration has processing functionality 110 not been shown for each flow diagram in this disclosure. However, one of ordinary skill in the art will recognize that image processing is preferably carried out by computer processors, which may include without limitation various hardware and graphic accelerators, and optional special purpose digital hardware for speeding up or otherwise enhancing the image processing operations.

Figure 6A:
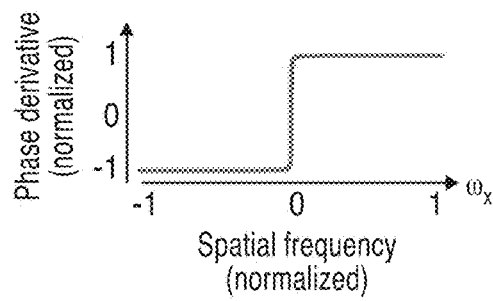
FIG. 6A through FIG. 6E are plots of phase kernel and phase derivative relationships utilized according to an embodiment of the present disclosure.
Figure 6B:
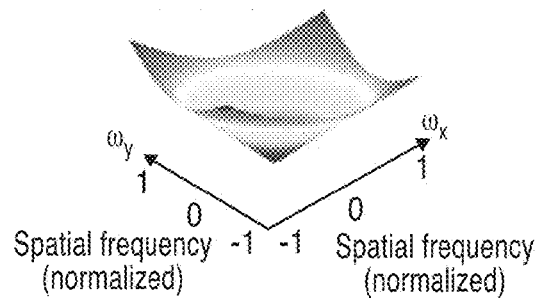
Figure 6C:
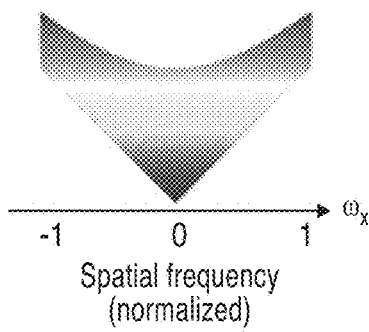
Figure 6D:
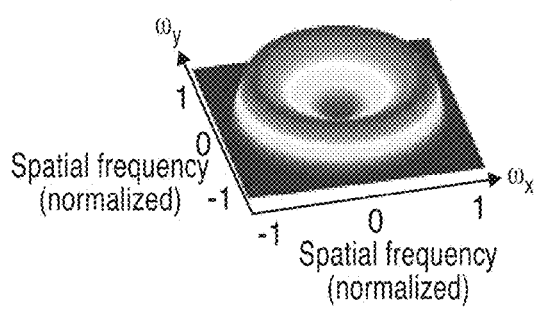
Figure 6E:
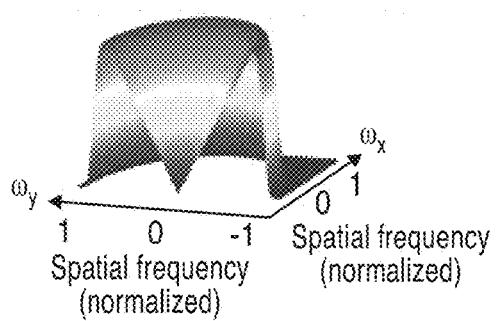

FIG. 6A through FIG. 6E depict various phase kernel and phase derivative relationships, in particular the normalized phase and the Phase Derivative of the Kernel in 1D and 2D spatial frequency coordinates. It should be noted that these images were originally depicted in color, while shown in this application as black and white for convenience of reproduction, and not by way of limitation. In FIG. 6A, Phase Derivative is seen in relation to 1D spatial frequency. In FIG. 6B a Phase profile is seen in relation to 2D spatial frequency, with a cross section of it seen in FIG. 6C. In FIG. 6D is shown 2D phase after application of the spatial frequency mask, with its side view cross section seen in FIG. 6E.

Figure 7A:
FIG. 7A through FIG. 7D are images (Lena) depicting comparisons between an original image using two different Canny methods, as compared with edge detection according to an embodiment of the present disclosure.
Figure 7B:
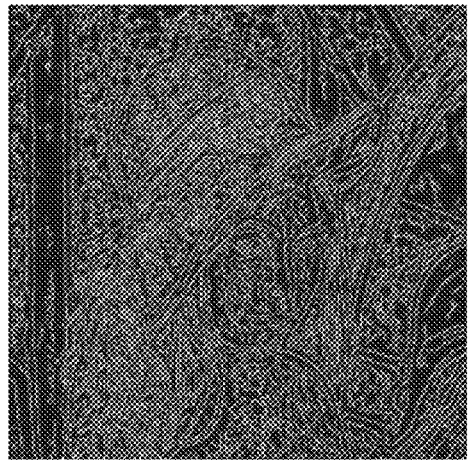
Figure 7C:
Figure 7D:

FIG. 7A through FIG. 7D depict an image comparison between the disclosed edge detection method with that of the the Canny edge detection method. The image under analysis is the "Lena" image whose original is seen in FIG. 7A. Results of edge detection in three cases are shown with FIG. 7B depicting Canny edge detection with default threshold parameters, FIG. 7C depicting Canny with optimized parameters to emphasize the sharp features, and in FIG. 7D the disclosed edge detection technology is shown.

Figure 8A:
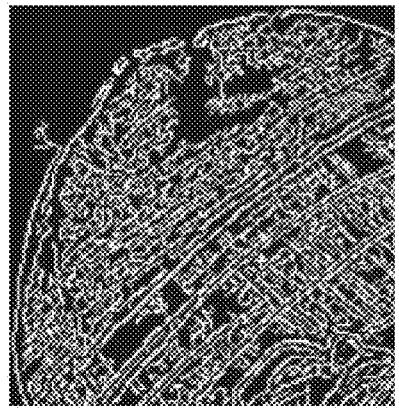
FIG. 8A through FIG. 8D are images (Lena hat portion) depicting comparisons between an original image using two different Canny methods, as compared with edge detection according to an embodiment of the present disclosure.
Figure 8B:
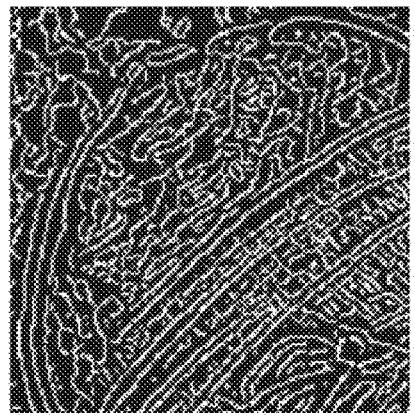
Figure 8C:
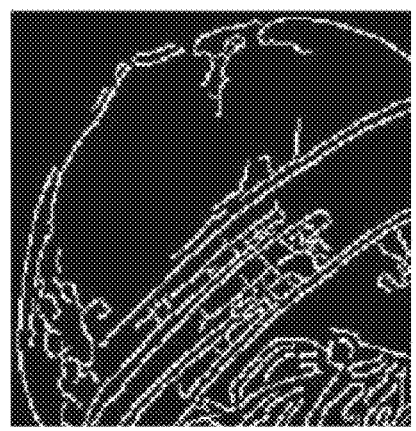
Figure 8D:
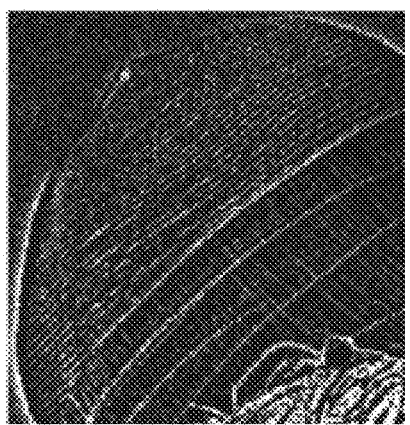

FIG. 8A through FIG. 8D depicts a comparison of the performance of the disclosed technology with that of the Canny method for edge and texture detection. The image under analysis is a portion of the "Lena" image with fine texture (the hat), as seen in FIG. 8A. Results of edge and texture detection in three cases are shown. In FIG. 8B, a Canny output is shown with optimized parameters to de-emphasize the sharp features, while in FIG. 8C a Canny output is seen with optimized parameters to emphasize the sharp features. In FIG. 8D, edge and texture detection is seen as generated by the disclosed technology.

Figure 9A:
FIG. 9A through FIG. 9D are images (ocean liner) depicting comparisons between an original image using two different Canny methods, as compared with edge detection according to an embodiment of the present disclosure.
Figure 9B:
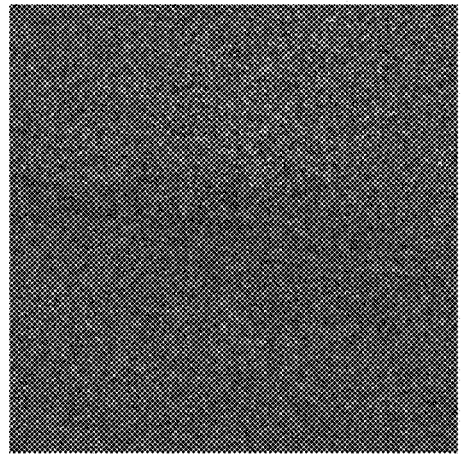
Figure 9C:
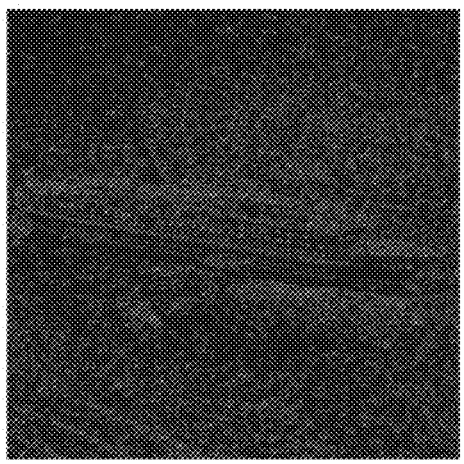
Figure 9D:
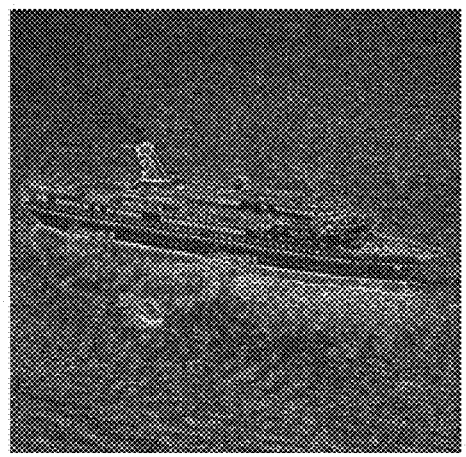

FIG. 9A through FIG. 9D depicts a performance comparison between the disclosed technology and that of the Canny method for edge, shape and feature detection. The image under analysis is a ship upon the ocean as seen in original image of FIG. 9A. Results of edge detection in three cases are shown, Canny with default threshold parameters in FIG. 9B, Canny with optimized parameters to emphasize the sharp features in FIG. 9C, and the disclosed technology in FIG. 9D illustrating improved edge detection and recognition allowing the ship to be easily discerned.

It should be appreciated that images being processed in certain applications, such as radar generated images, can have complex valued input images (data), with the output being another complex-valued data comprising amplitude and phase, with phase utilized for object detection, or tracking, or motion estimation, or edge detection, or any desired combination thereof. In at least one embodiment, the phase transform can be implemented in response to operating on the image data with a mixer and local oscillator having a warped, non-linear, chirp.

Figure 10A:
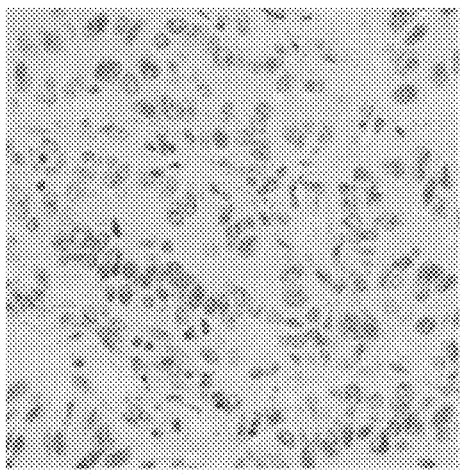
FIG. 10A through FIG. 10D are images (tissue sample) depicting comparisons between an original image using two different Canny methods, as compared with edge detection according to an embodiment of the present disclosure.
Figure 10B:
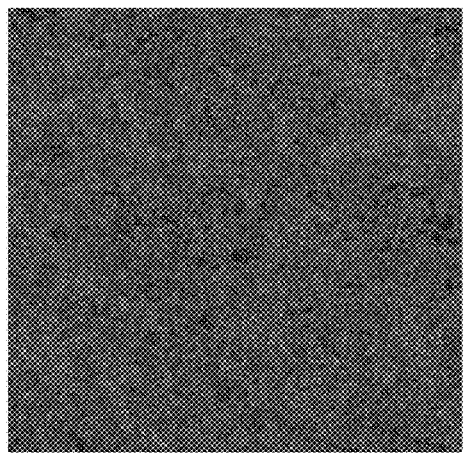
Figure 10C:
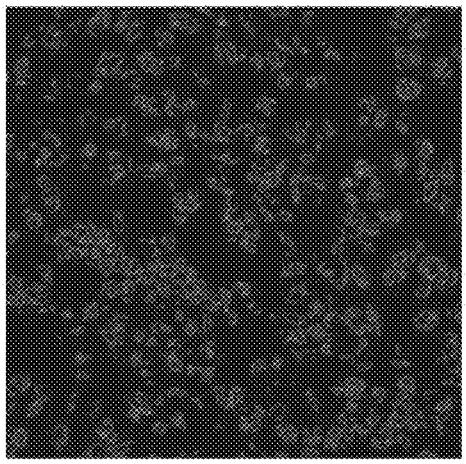
Figure 10D:
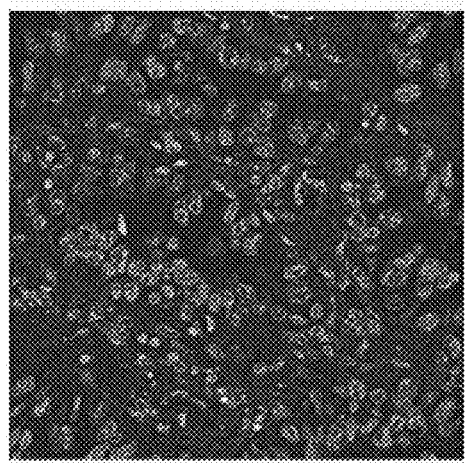

FIG. 10A through FIG. 10D depicts a performance comparison between the disclosed technology and the Canny method when applied to tissue analysis. The image under analysis is a pathology slide from a lung tissue, as seen in FIG. 10A. Results of edge detection in three cases are shown, with Canny having default settings in FIG. 10B, Canny with optimized parameters to emphasize the sharp features in FIG. 10C, and the disclosed edge detection method seen in FIG. 10D as applied here to digital pathology. It can be seen in the image comparison that structures that cannot be discerned from the Canny method are readily apparent in the image generated from the disclosed method.

Figure 11A:
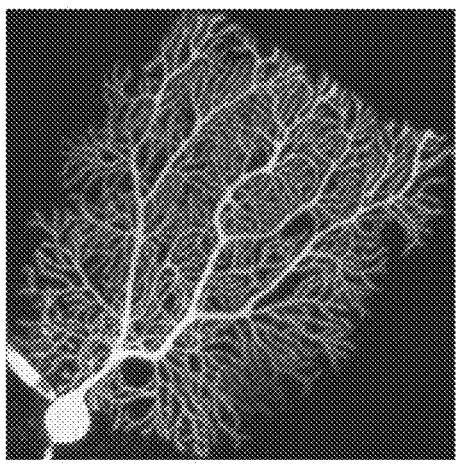
FIG. 11A through FIG. 11D are images (brain neural tree) depicting comparisons between an original image using two different Canny methods, as compared with edge detection according to an embodiment of the present disclosure.
Figure 11B:
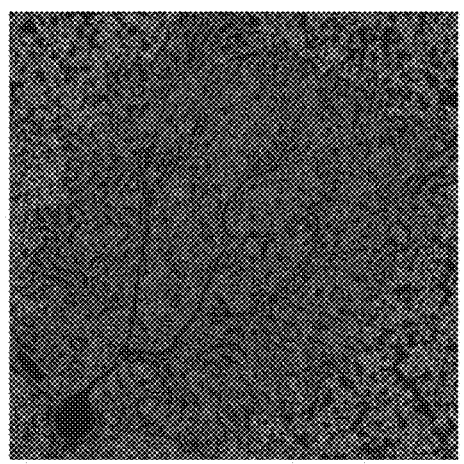
Figure 11C:
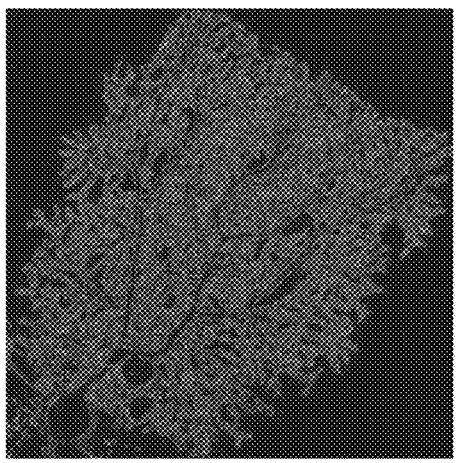
Figure 11D:
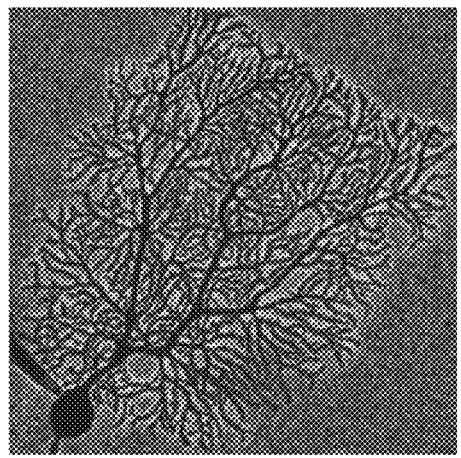

FIG. 11A through FIG. 11D depict a performance comparison between the disclosed technology compared to the Canny method when used for brain mapping. The image under analysis is a rat Purkinje neuron injected with a fluorescent dye as seen in FIG. 11A. Results of edge detection in three cases are shown, Canny with default settings in FIG. 11B, Canny with optimized parameters to emphasize the sharp features in FIG. 11C, and in FIG. 11D the disclosed edge detection and feature extraction of the disclosed technology. The branching structures are more readily apparent in FIG. 11D than in the images generated with the Canny method as seen in FIG. 11B and FIG. 11C.

FIG. 12A through FIG. 12D depict a performance comparison between the disclosed technology and the Canny method when applied to detection in an impaired image. In this example the impairment comprises an upper section of the image that is partially masked. The objective of the edge and feature extraction is to detect fine features under the mask. In FIG. 12B an image is seen which was output from a Canny process with default settings, while FIG. 12C shows an image output from Canny using optimized parameters to emphasize the sharp features. In FIG. 12D an output from the disclosed technology is seen for feature, object and texture detection in an impaired image. Again, it is readily seen that the disclosed technology improves detection of fine features in the image as well as under the mask.

FIG. 13A through FIG. 13C depict a performance comparison between the disclosed technology and that of Canny when applied to detection in fog as seen in original image 13A. In FIG. 13B image output is seen from Canny having optimized parameters to emphasize sharp features, which is compared with the output in FIG. 13D from the disclosed technology. It will be noticed that the fog seen in the original image which somewhat obscures the bicyclist near the centerline, is readily discerned from the output of the present technology, while this feature is hidden in the image generated by the Canny method.

Figure 14:
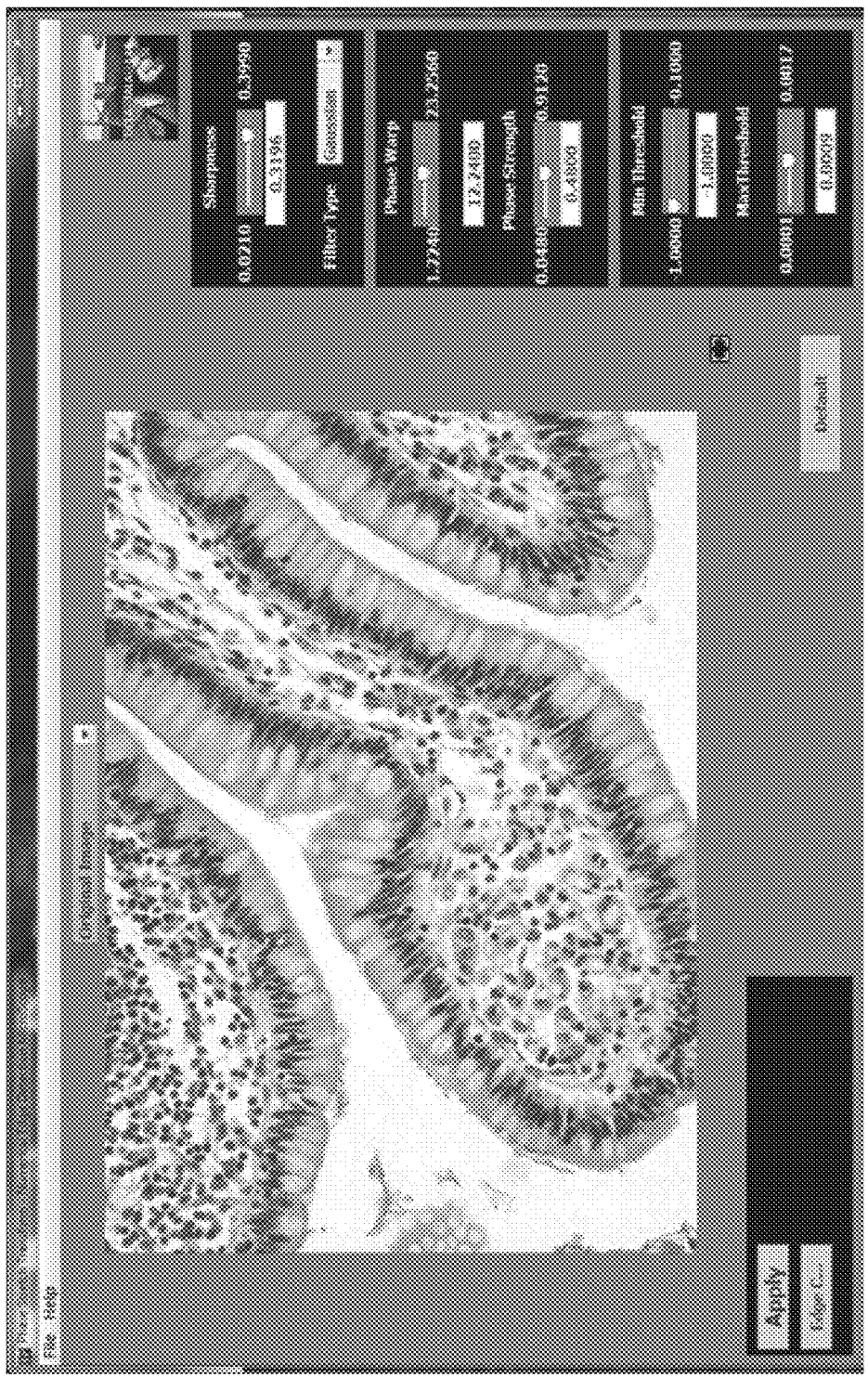
FIG. 14 through FIG. 17 are images (tissues) showing an original image (FIG. 14) and different parameter selections utilizing an interactive edge detection for generating different edge enhanced images (FIG. 16 through FIG. 17).
Figure 15:
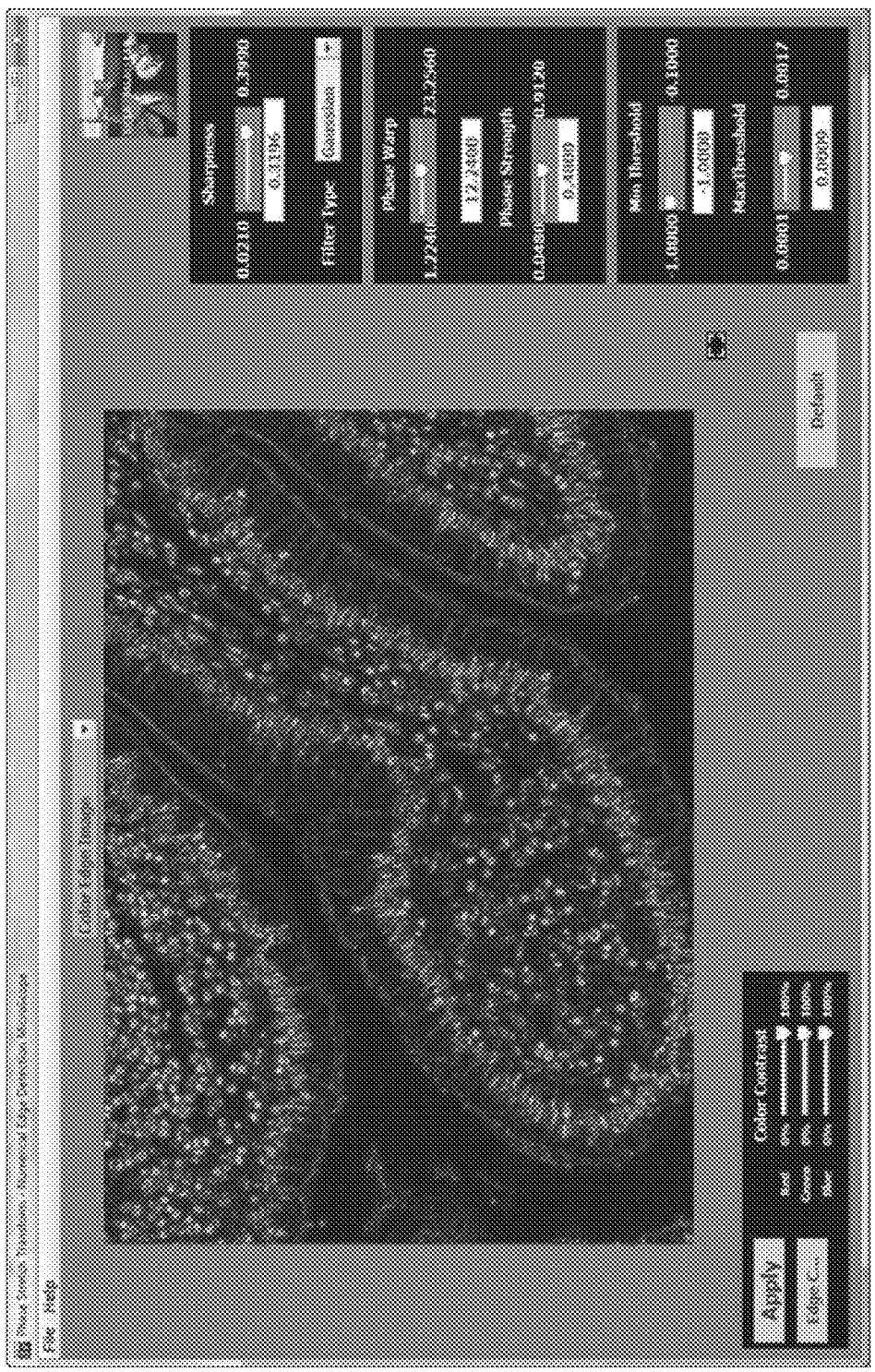
Figure 16:
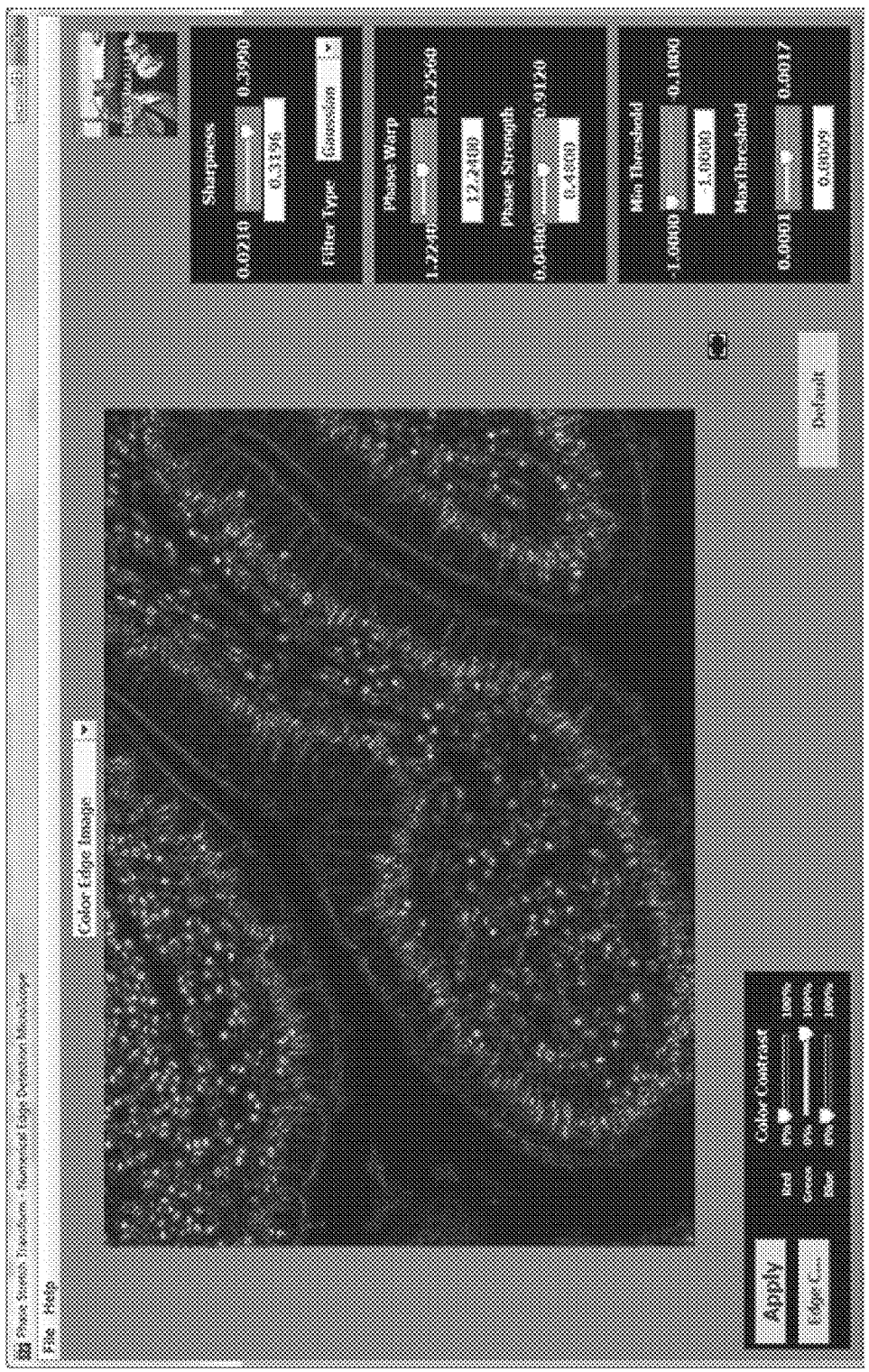
Figure 17:
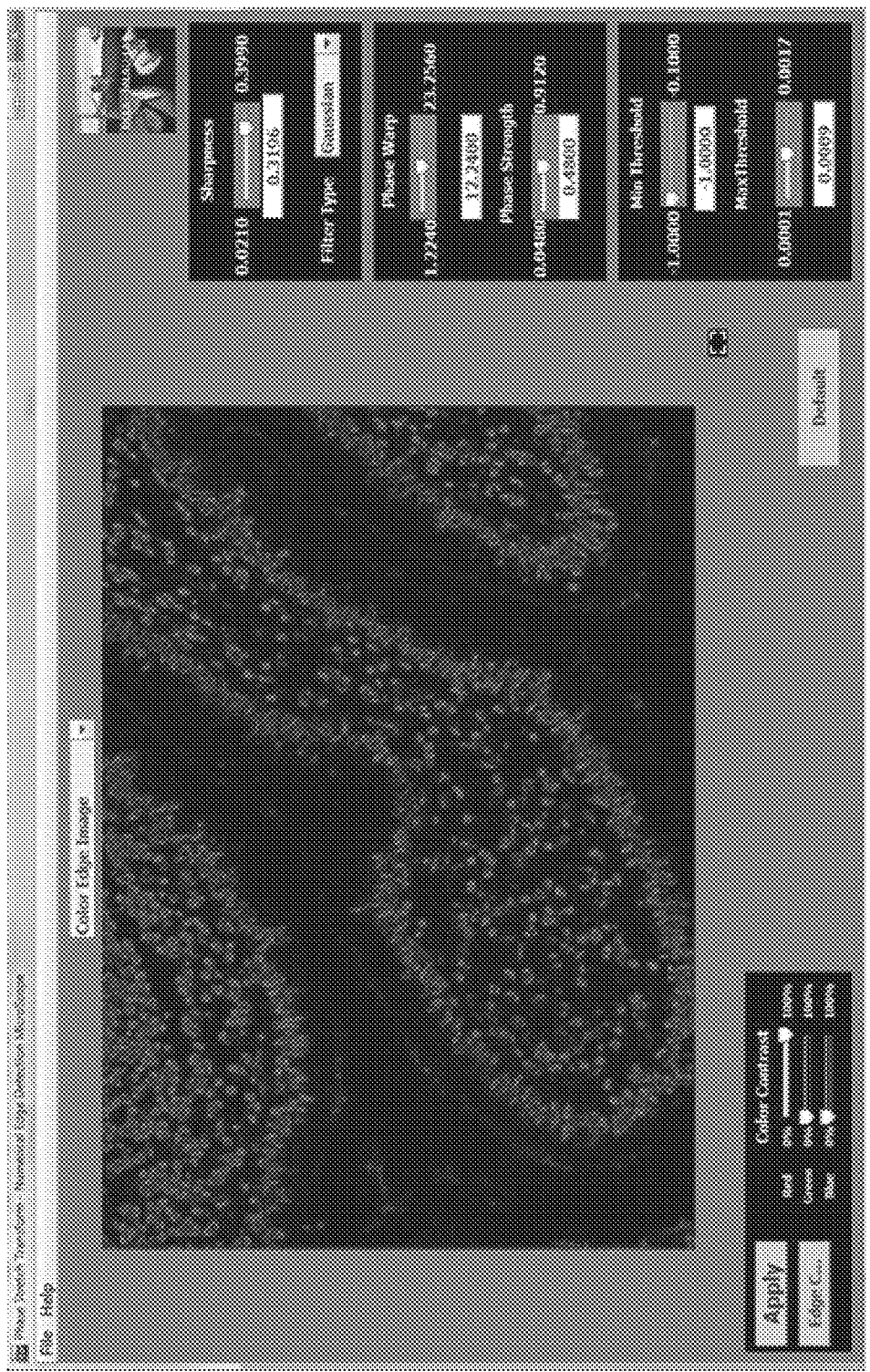

FIG. 14 through FIG. 17 depicts screen shots of interactive edge-detection in numerical microscopy of the present disclosure, such as performed on a numerical phase-imaging microscope. It should be recognized that the attached images, although shown in black and white in this application, were in actuality color images, as were a number of the images seen throughout this application. In FIG. 14 an original input image is seen, while in FIG. 15 "color edge image" has been selected, whereas the edges are seen, with the selected parameters of Color Contrast, Sharpness, Phase Warp, Phase Strength, minimum Threshold, and Maximum Threshold. This image output shows edges detected on all three colors. Edges are shown as analog values that is to say that no thresholding or morphological operation is performed in this example. In this image color contrast is set with R, G and B all at 100%. In FIG. 16 and FIG. 17, the same Color Edge Image is seen, but with only the green (FIG. 16) and red (FIG. 17), with color contrast set at 100%, however, the screenshot shows the same parameters otherwise. In at least one embodiment, these images are processed by decomposing a source digital image to its constituent colors, followed by optional pre-filtering for noise reduction, prior to performing a phase operation, and any optional thresholding and morphological operations on each color.

A number of additional operations are described below that are applicable to images in FIG. 16 and FIG. 17, as well as the other application directed embodiments described. In one preferred embodiment, the user is allowed to adjust the amplitude for each color, as seen in the lower left corner of FIG. 16 and FIG. 17. In at least one embodiment a minimum intensity trigger is used on the source image to remove low intensity pixels and improve the signal to noise ratio, as seen by the minimum threshold selection in FIG. 16 and FIG. 17. In at least one embodiment, a morphological operation is utilized which is configured for finding and discarding isolated pixels, and identifying and maintaining continuous lines and curves in the output image. In at least one of the embodiments, the disclosed method/apparatus is configured to allow the user to select an image scale (zoom). In this embodiment, the parameters for steps of pre-filtering, Phase Transform, thresholding and morphological operation are preferably updated automatically based on this user-selected scale at which the output image is displayed, for improving identification and display of features in the image.

Figure 18:
FIG. 18 through FIG. 21 are images (woman seated) of a photograph/video frame showing an original image (FIG. 18) and different parameter selections utilizing an interactive edge detection for generating different edge enhanced images (FIG. 19 through FIG. 21).
Figure 19:
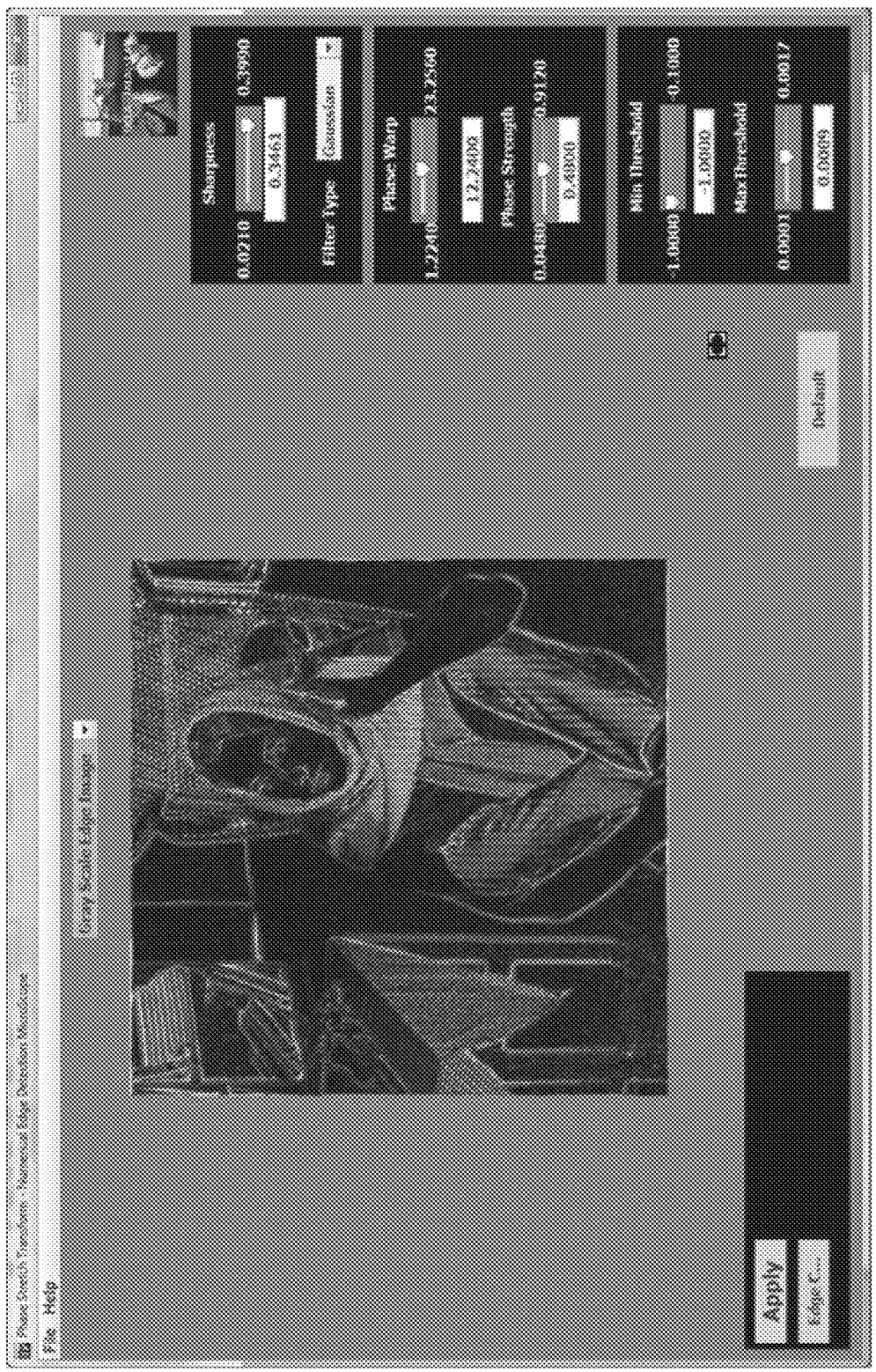
Figure 20:
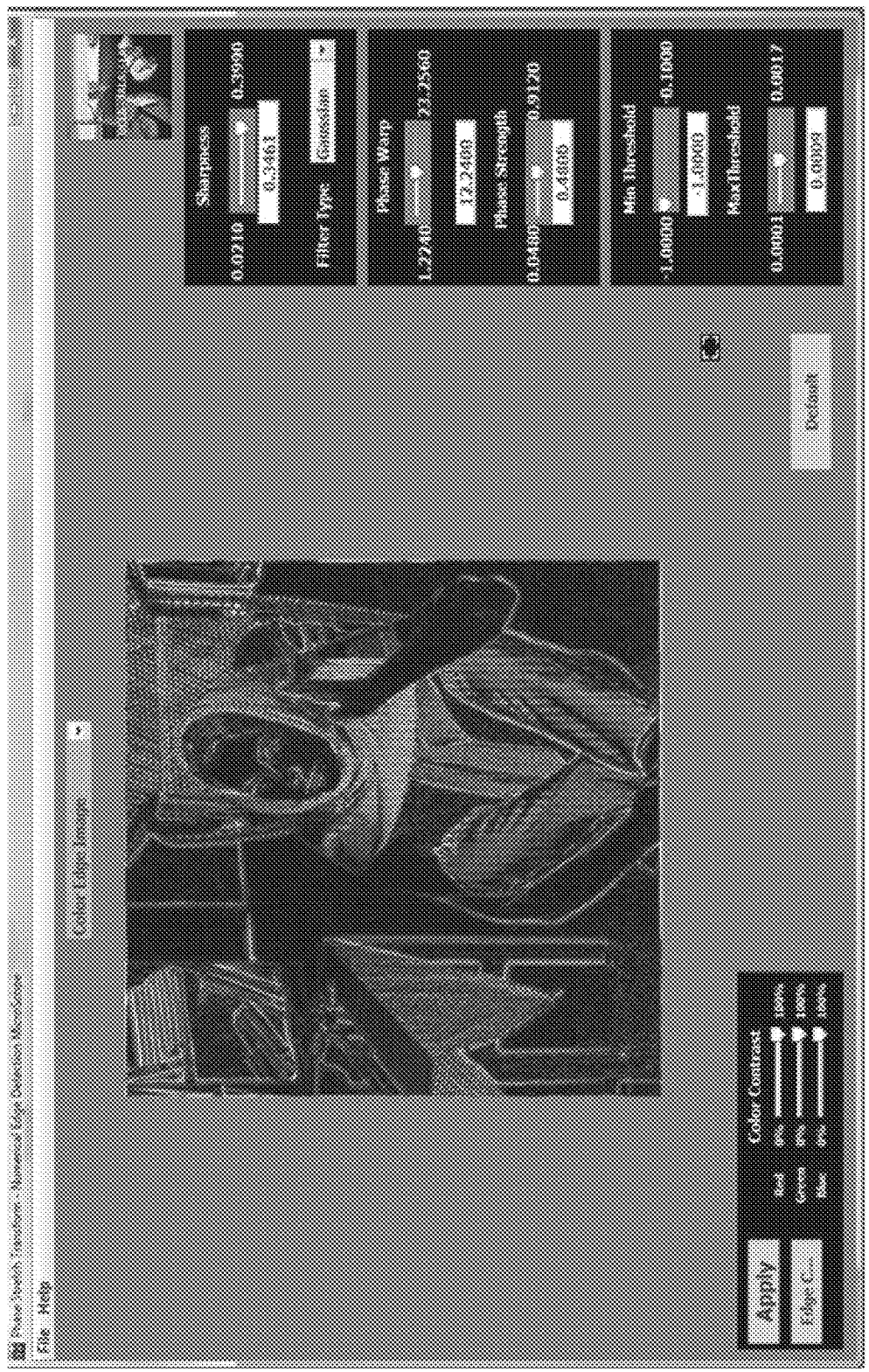
Figure 21:
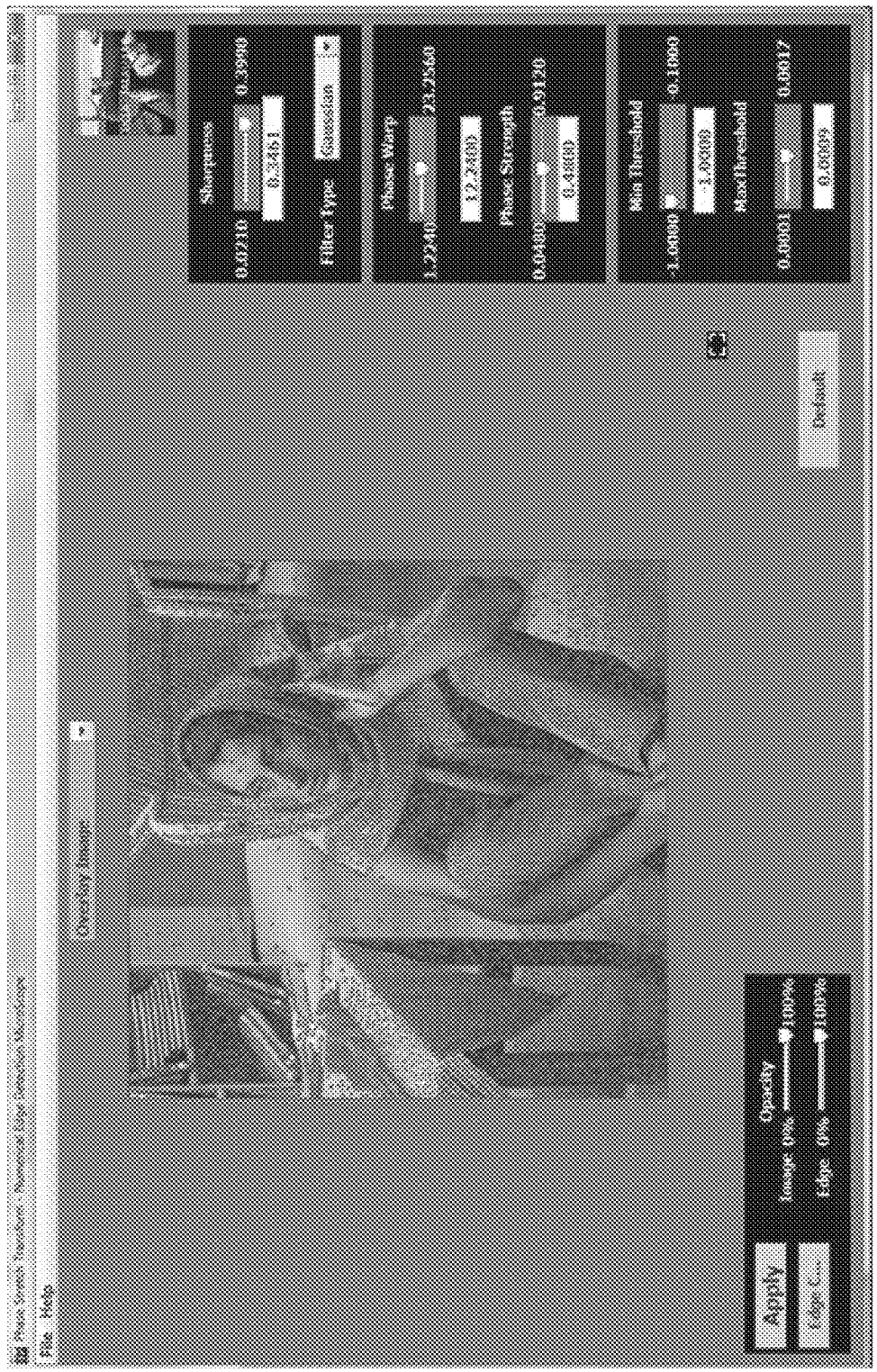

FIG. 18 through FIG. 21 depict operations of the disclosed edge and feature extraction as applied to a photograph, or video frame, whose original image is seen in FIG. 18. In FIG. 19 a "Gray Scale Edge Image" has been selected, while in FIG. 20 a "Color Edge Image" was selected. In FIG. 21 an "Overlay Image" has been selected with Opacity set for the image and the edge at 100%, whereby the output shows edges of all colors overlaid with the original image, and have been processed with both thresholding and morphological operations on the edge image.

Figure 22:
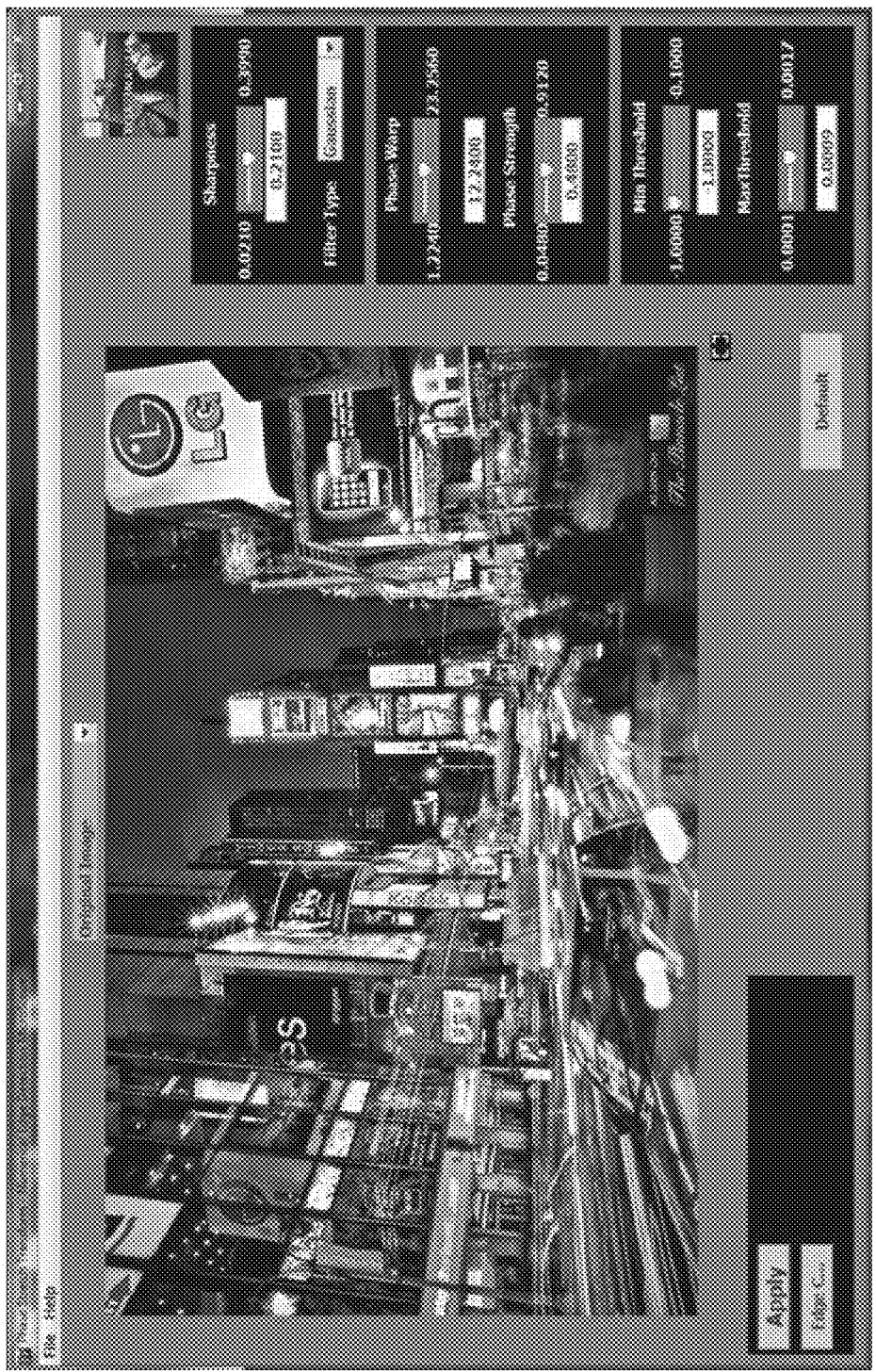
FIG. 22 and FIG. 23 are images (city street) of a photograph/video frame showing an original image (FIG. 22) and interactive edge detection for generating different edge enhanced images (FIG. 23).
Figure 23:
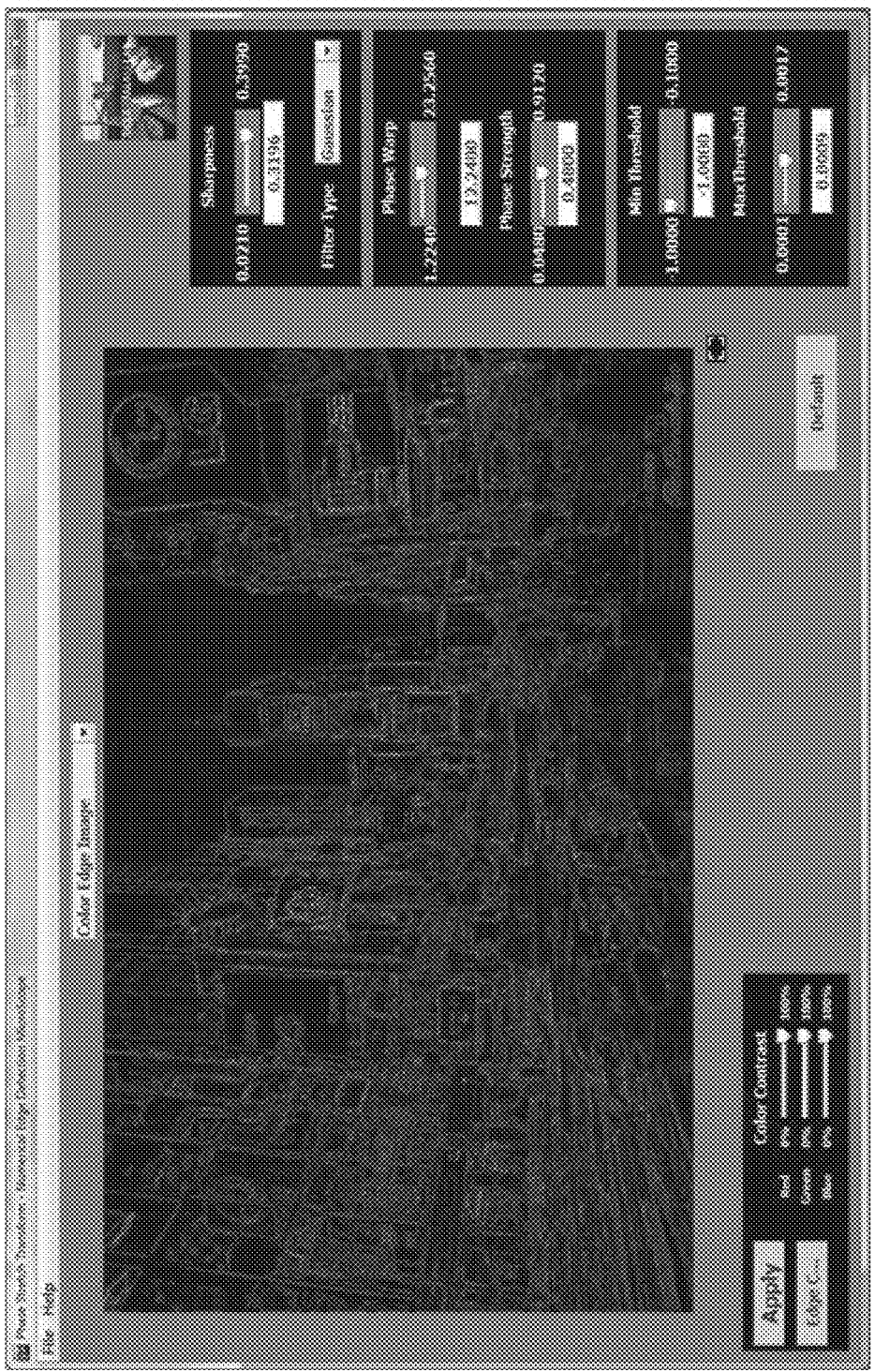

FIG. 22 and FIG. 23 illustrate operation on a color image of long exposure busy city street scene seen in original image of FIG. 22. In FIG. 23 the disclosed method of "Color Edge Image" was selected and the output image shows edges of all three colors. The edges are shown as analog values, with no thresholding or morphological operations in this example.

Figure 24:
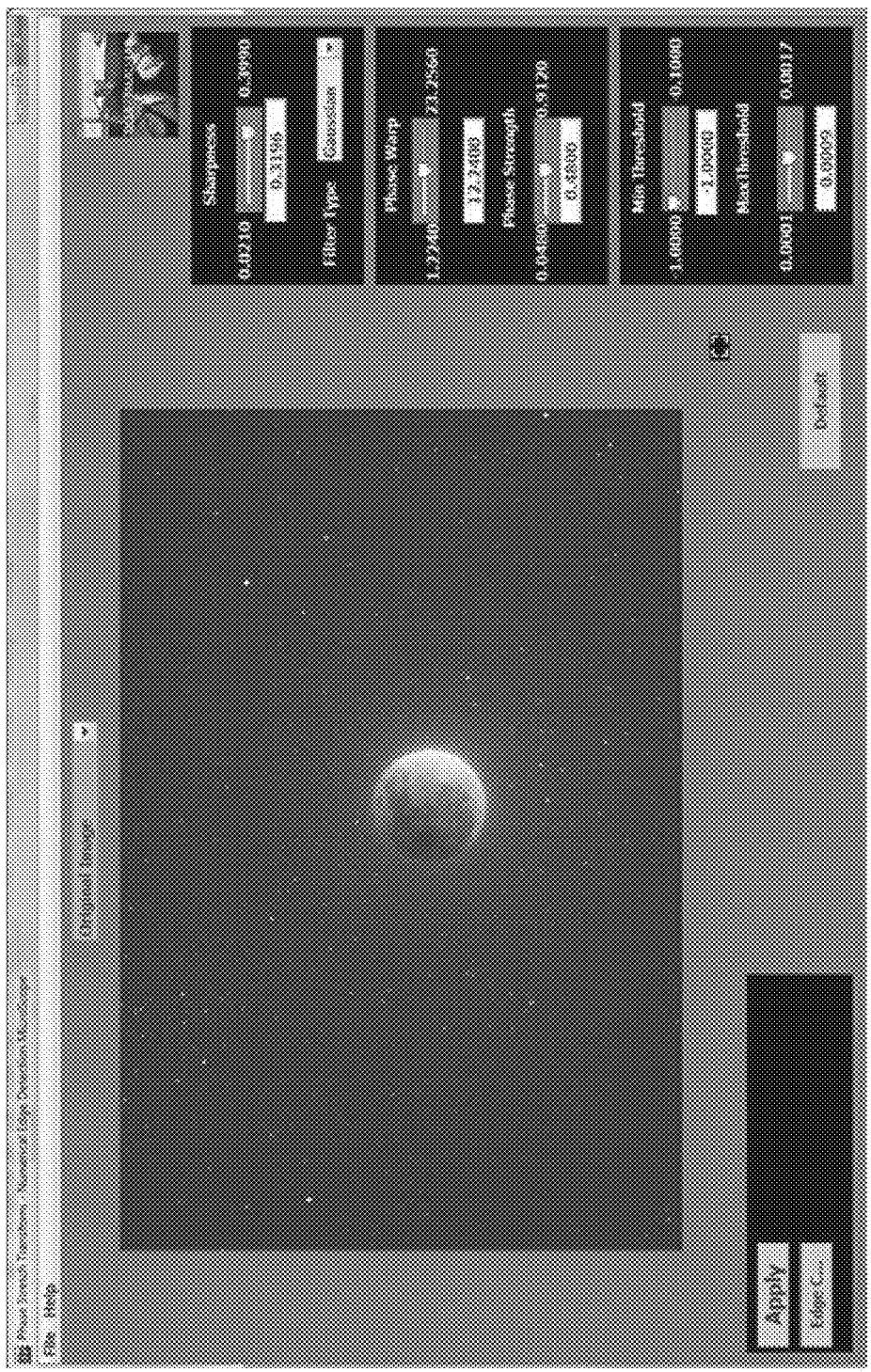
FIG. 24 through FIG. 26 are images (planetary body) of an astronomic image showing an original image (FIG. 24) and different parameter selections utilizing an interactive edge detection for generating different edge enhanced images (FIG. 25 through FIG. 26).
Figure 25:
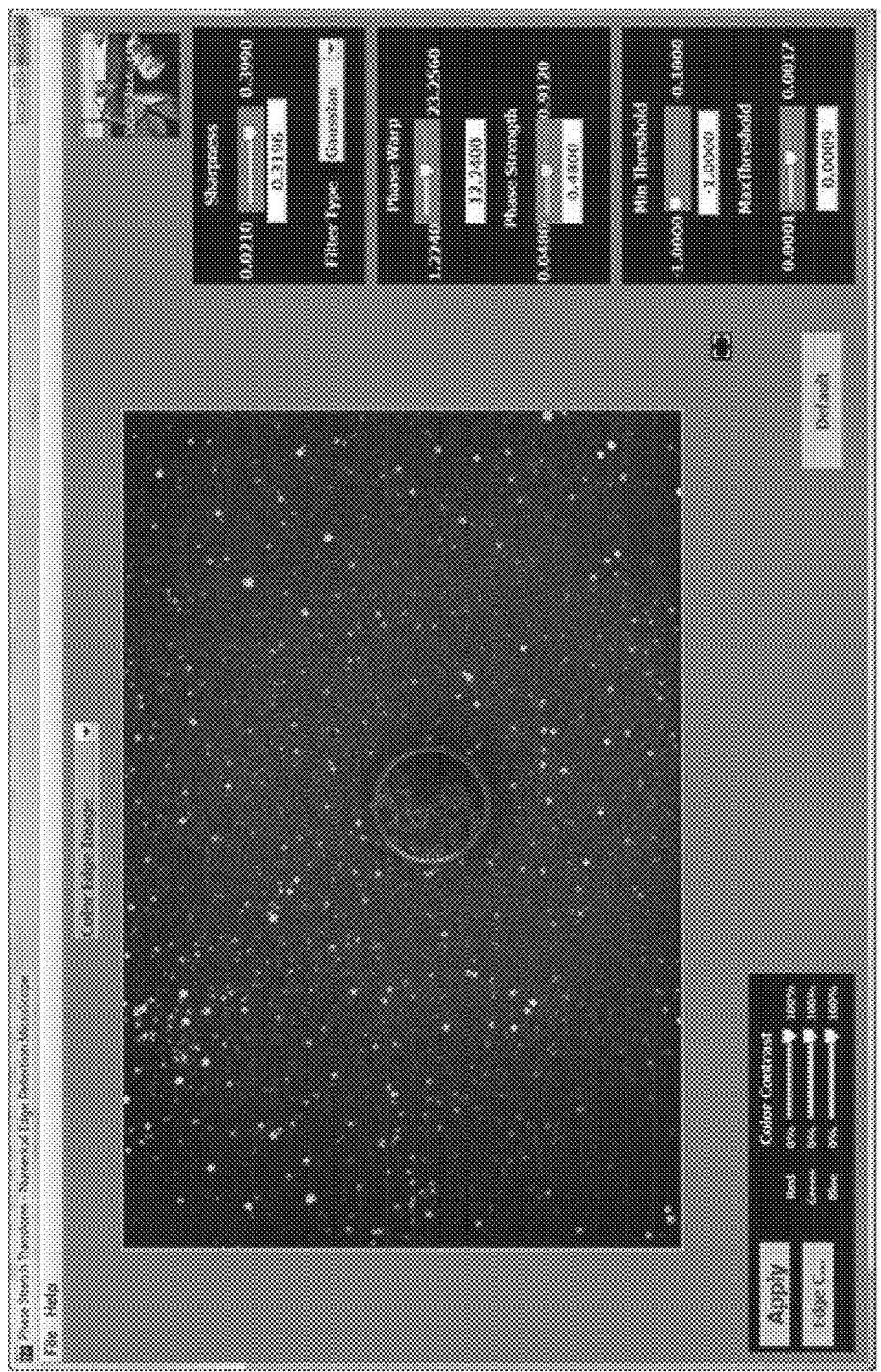
Figure 26:
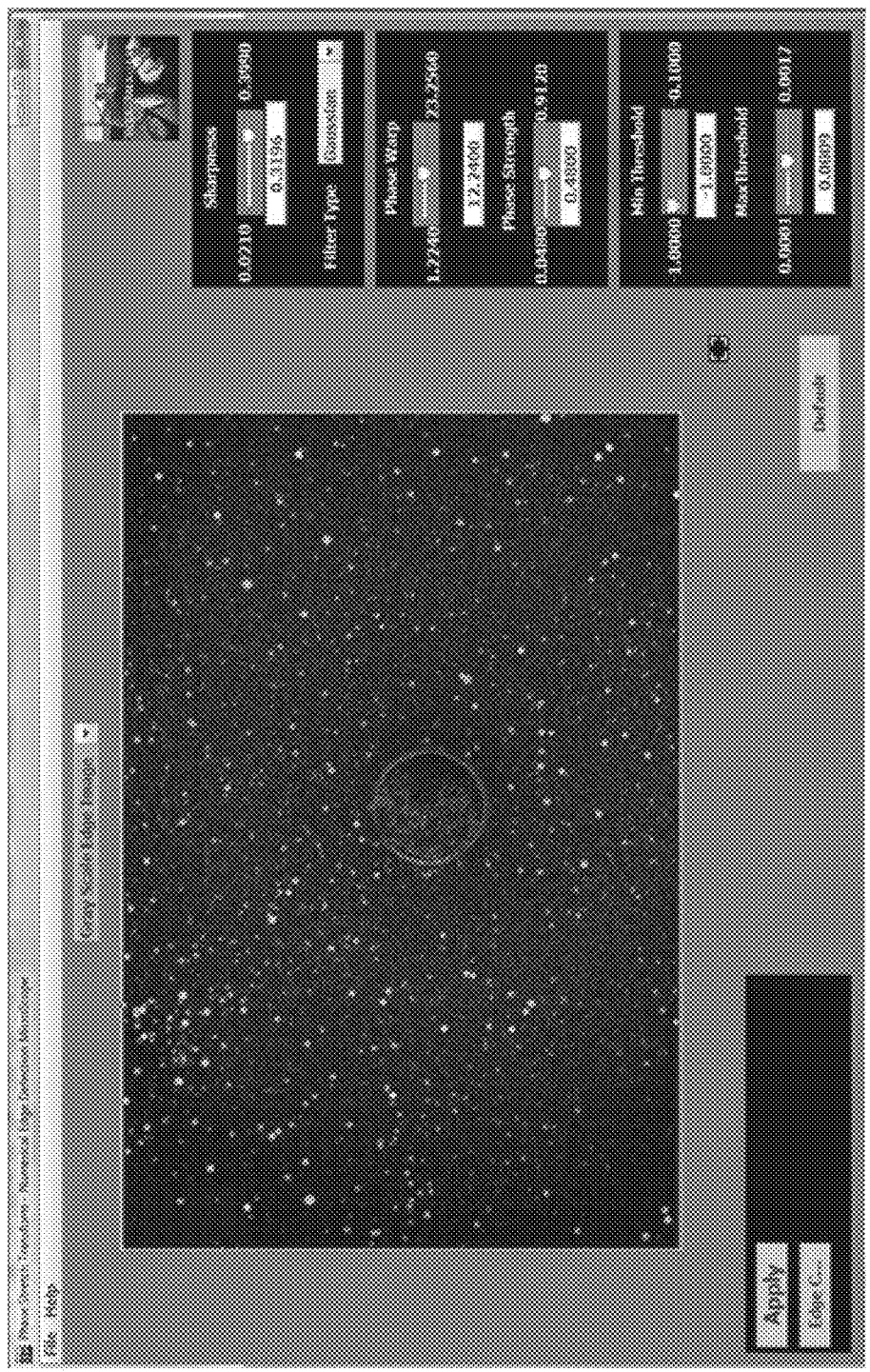

FIG. 24 through FIG. 26 illustrate an astronomy example of a celestial body seen in original image in FIG. 24. In FIG. 25 "Color Edge Image" according to the disclosed technology was selected with the output showing edges in all three colors. In this example the edges are shown as analog values, with no thresholding or morphological operations performed. In FIG. 26 "Gray Scale Edge Detection" was performed according the presented disclosure, whereby the output shows edges of a gray-scale image. In this example, the edges are shown as analog values with no thresholding or morphological operations utilized.

Figure 27:
FIG. 27 and FIG. 28 are images (brain) of a photograph/video frame showing an original image (FIG. 27) and interactive edge detection of overlaid edge data from a medical imaging source in an output image (FIG. 28).
Figure 28:
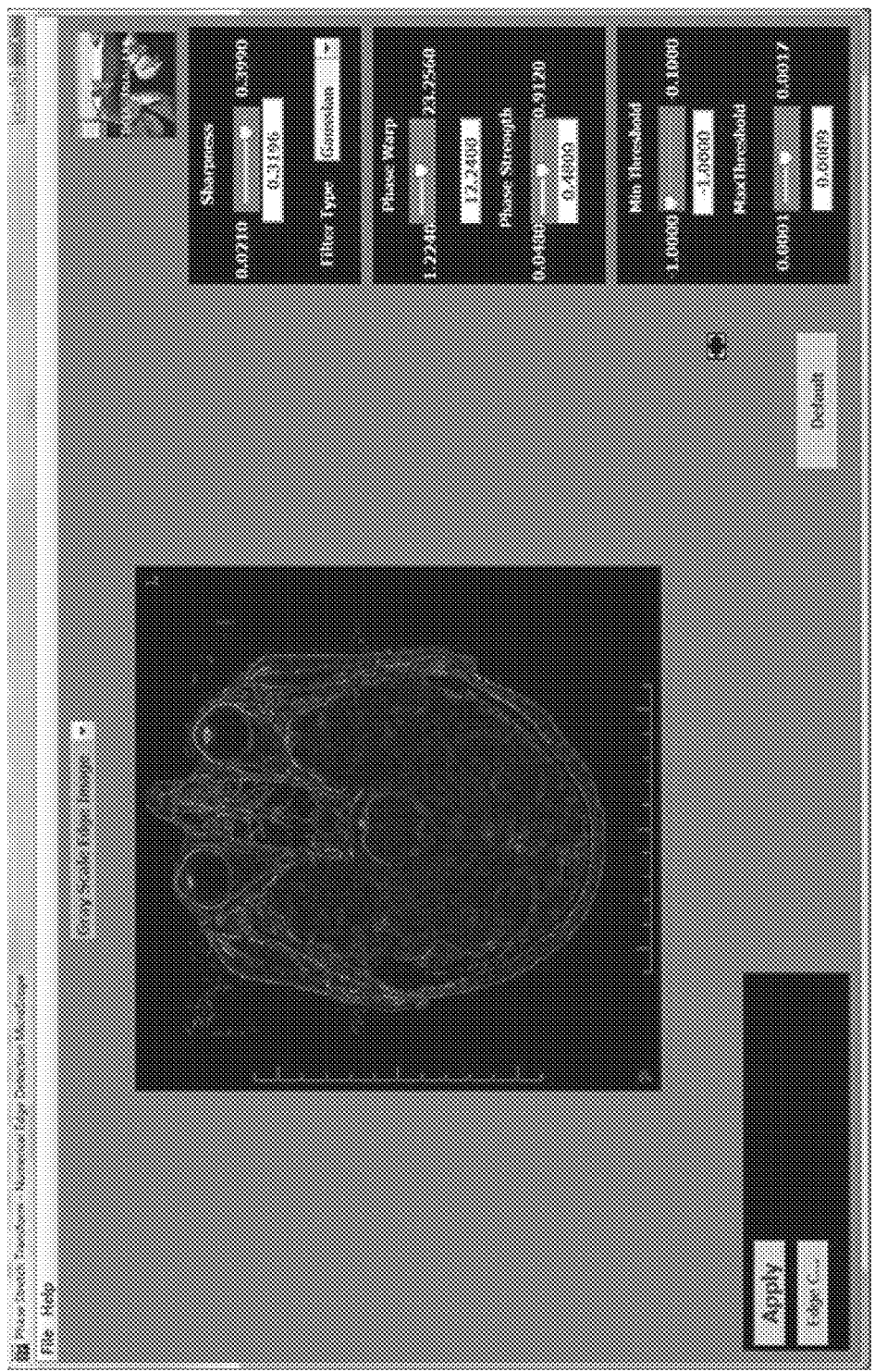

FIG. 27 and FIG. 28 illustrates a medical example of the disclosed technology, shown applied to an original cranial image in FIG. 27. In FIG. 28 a "Gray Scale Edge Image" was selected again with edges shown as analog values, and without the use of thresholding or morphological operations.

Figure 29A:
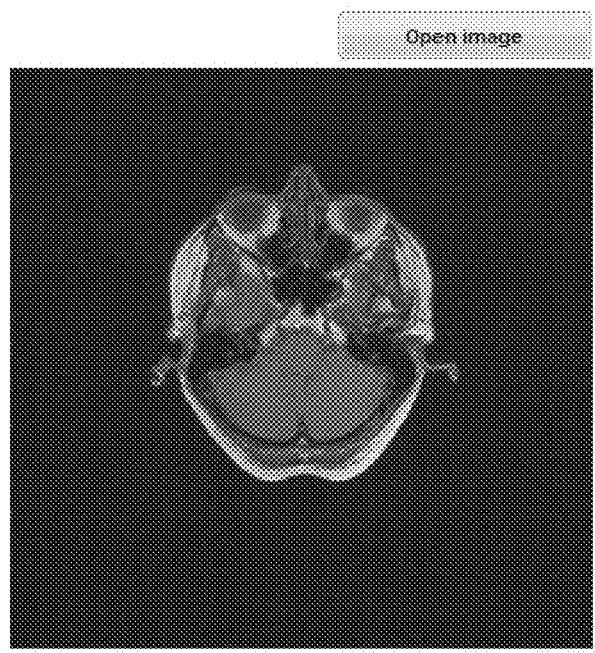
FIG. 29A through FIG. 29D are images (brain MRI) depicting an application for utilizing edge detection according to an embodiment of the present disclosure, for processing an image or sequence (i.e., frames of video) with user selected parameters (FIG. 29D).
Figure 29B:
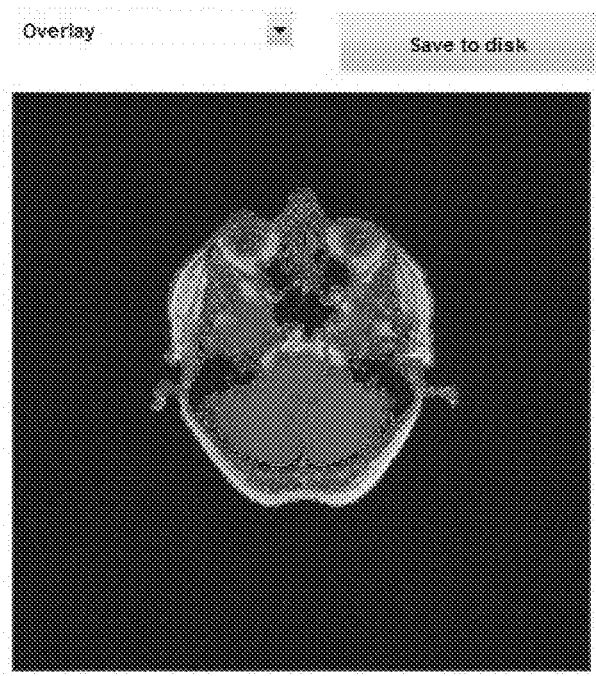
Figure 29C:
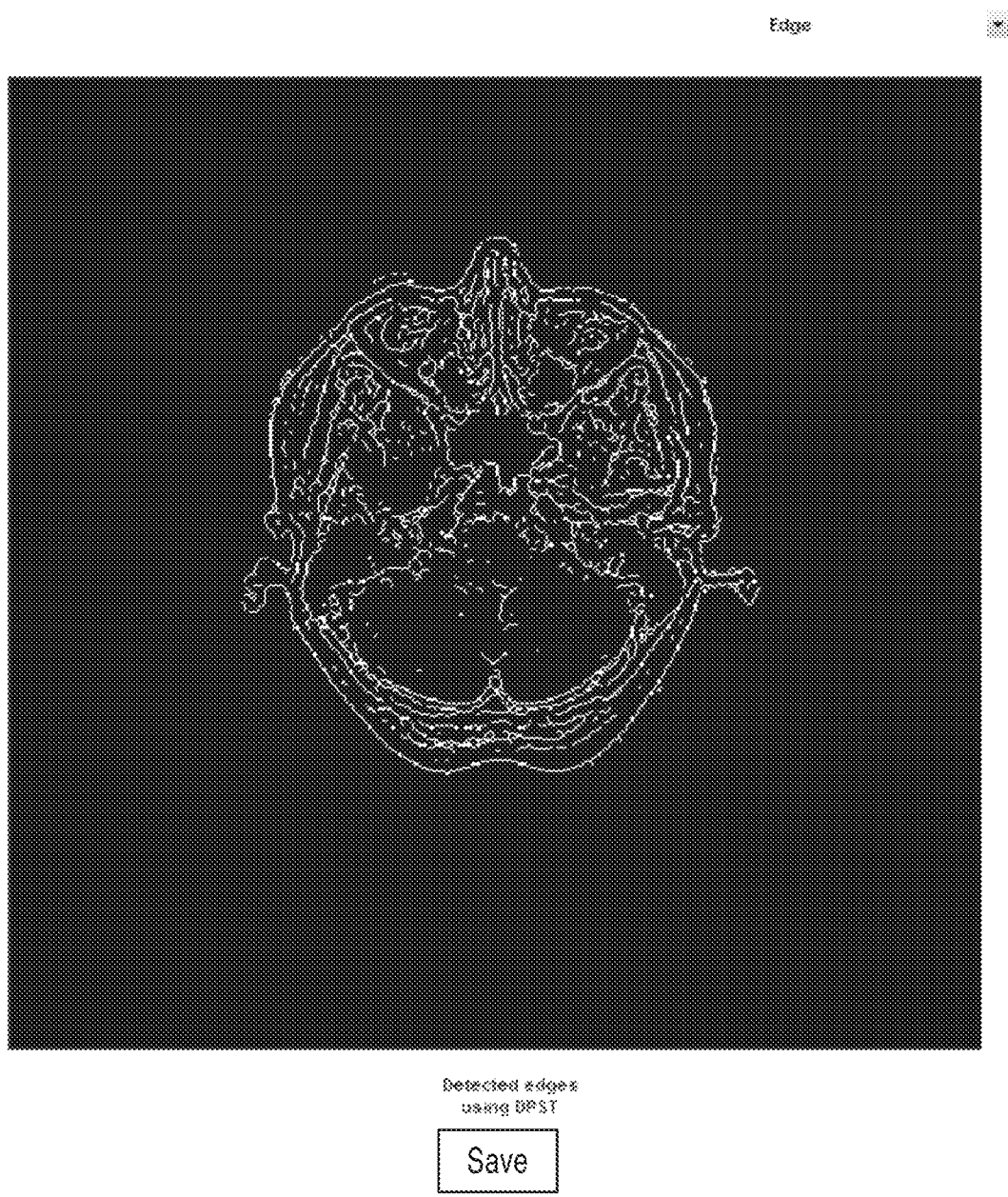
Figure 29D:
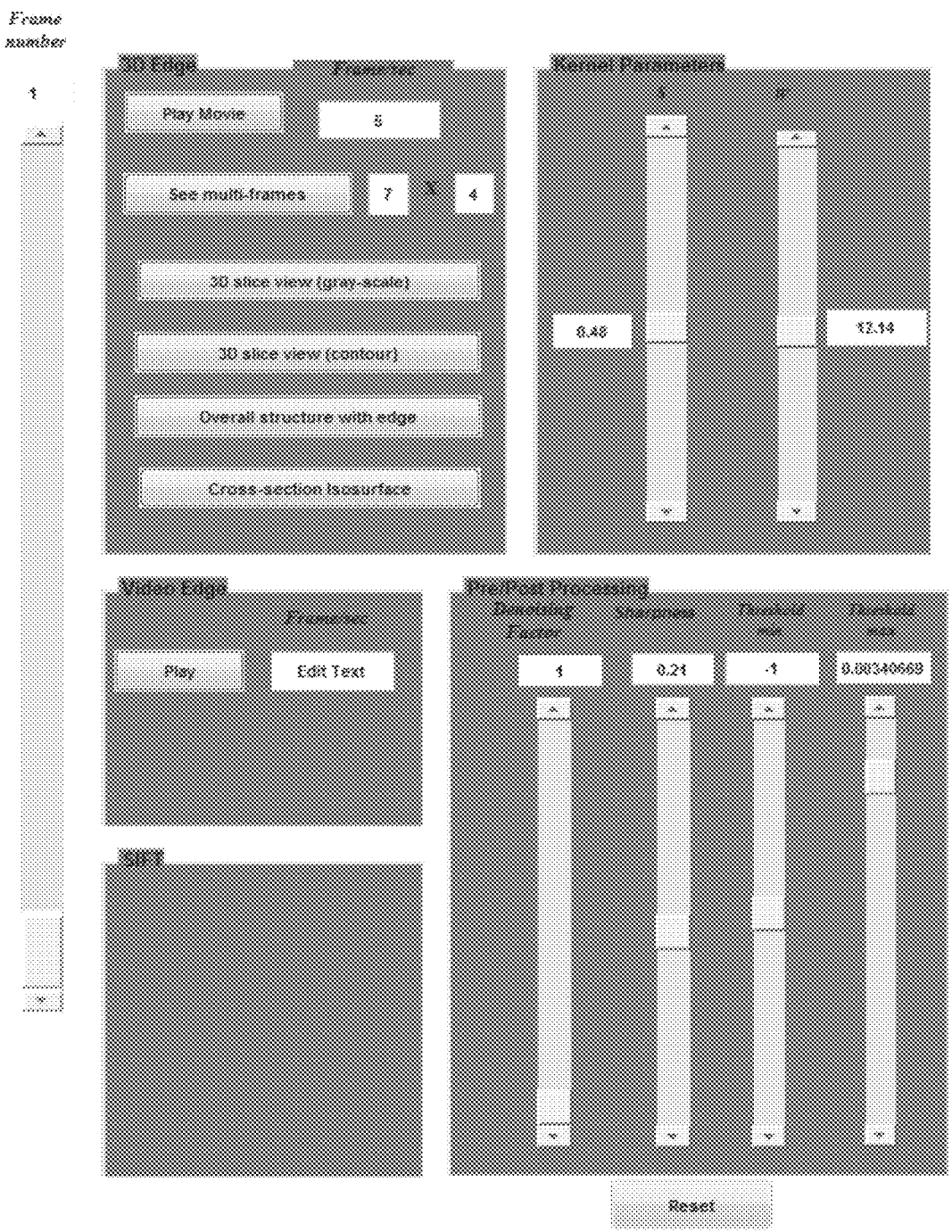

FIG. 29A through FIG. 29D illustrate an example of using the presented technology for performing 3D reconstruction on an original brain image in FIG. 29A. Output is seen in FIG. 29B as a selected "Overlay" showing edges detected on a brain MRI image (frame number 1) which has been overlaid on the source image. In FIG. 29C "Edge" has been selected that bring outs more edge details that were enhanced by using thresholding or morphological operations. In FIG. 29D a user interface is seen allowing the user to control various selections of the edge and feature extraction process, including playing a video sequence, selecting a frame of a video sequence, seeing multiple frames, generating a slide view (gray scale), generating a slice view (contour), generating an overall structure with edge, generating a cross-section isosurface. Kernel parameters for both S and W can be selected. Video edge selections can be performed, and pre and post processing actions selected, which by way of example and not limitation comprise denoising factor, sharpness, and minimum and maximum threshold.

Figure 30A:
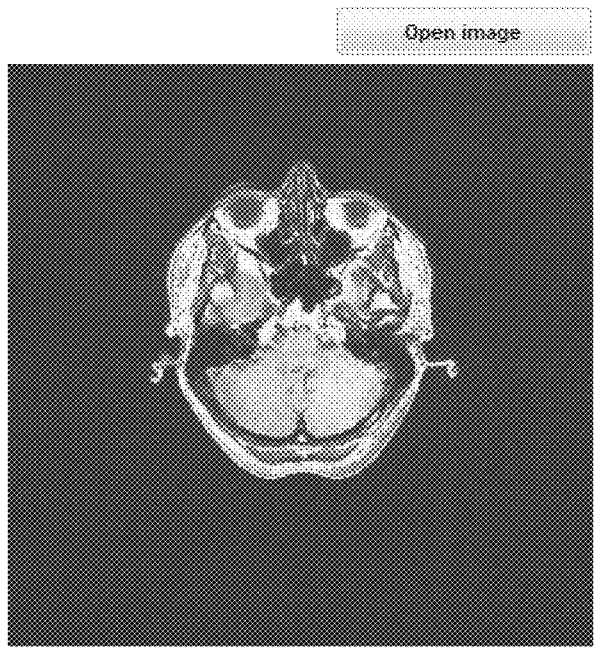
FIG. 30A through FIG. 30D are images (3D brain MRI) depicting an application for utilizing edge detection according to an embodiment of the present disclosure, for processing an image or sequence (i.e., frames of video) with user selected parameters (FIG. 30D).
Figure 30B:
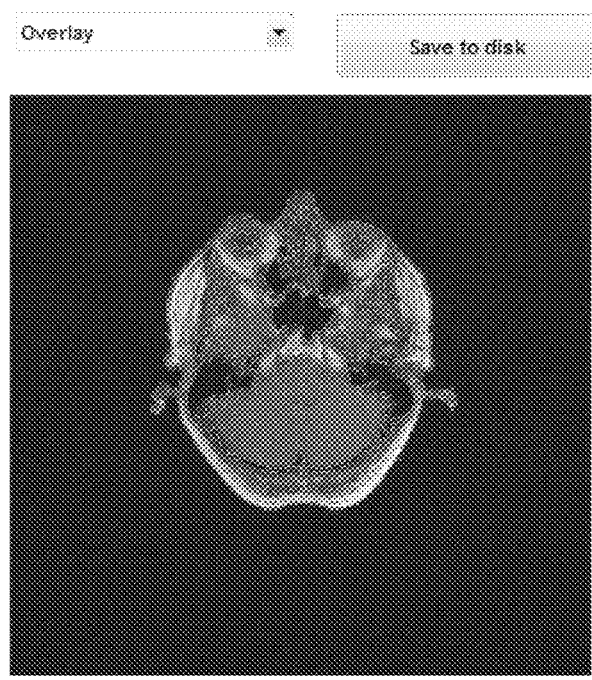
Figure 30C:
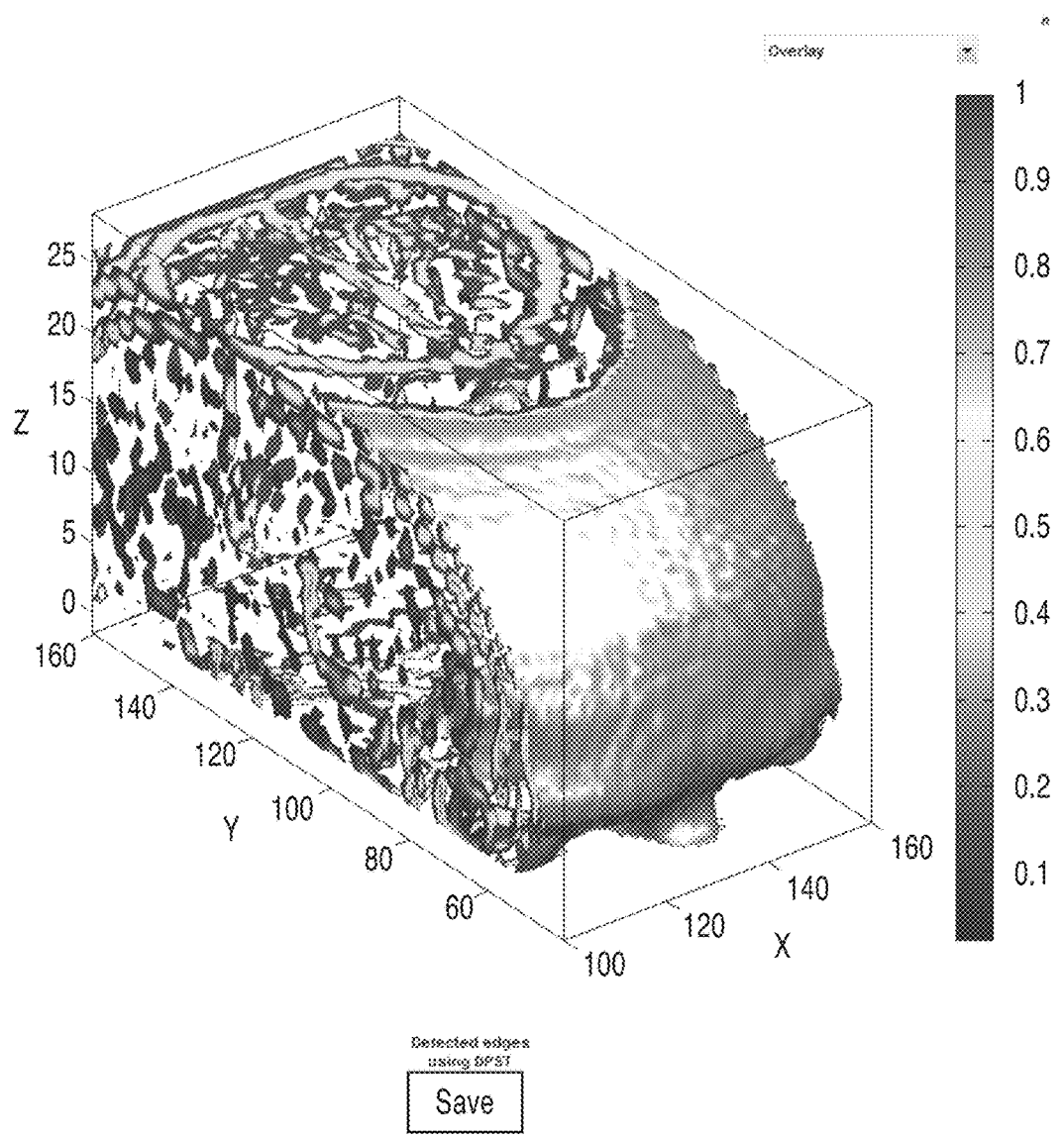
Figure 30D:
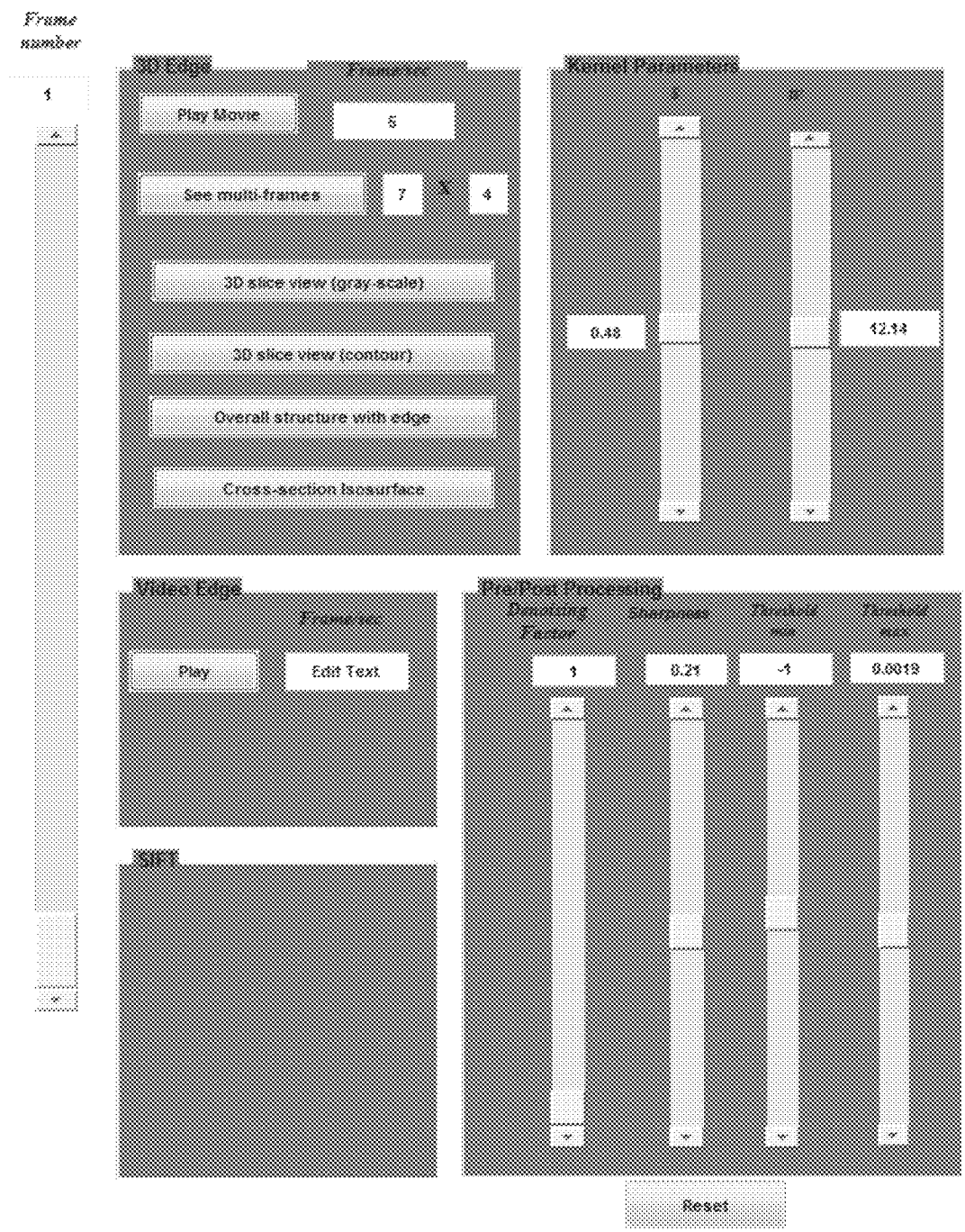

FIG. 30A through FIG. 30D illustrate another medical brain application of the disclosed edge detection on brain MRI images seen as original image in FIG. 30A. An overlay is selected in FIG. 30B. In FIG. 30C image output is seen in a 3D output showing edges detected on brain MRI images (horizontal frames number 1 and 26 and vertical frames number 100 and 160 in y direction) shown on the cross-sections of isosurface created from brain MRI images. Edges are shown as analog values with Jet colormap, with no added thresholding or morphological operations performed. In the 3D imaging seen in FIG. 30C, the edge detection method is preferably applied to individual 2D frames, constituting 2D cross sections of a 3D object, which is followed by optional sequential playback of the sequence of 2D edge images, and/or reconstruction and display of a 3D edge image from the 2D edge image sequence. It will be appreciated that although exemplified in regard to medical imaging, the 3D reconstruction described above can be utilized with any desired applications, such as within a numerical phase-imaging microscope, images from which are seen in FIG. 15 through FIG. 17.

2. Edge Detection Using Phase Stretch Transform (PST)

A phase operation is utilized in these embodiments which has some similarity to electromagnetic wave propagation through a diffractive medium. It has been appreciated in the present disclosure that the magnitude of the transformed image's complex amplitude can be used for data compression when the warp profile follows a specific shape. In addition, we have found that the phase of the transform also has unique and important properties. In particular, it is demonstrated that the phase can be utilized to create a new and effective edge detection technique. This is achieved by combining the phase properties of the Anamorphic Transform with localization kernel and with morphological post processing. It will be noted that the use of the so-called Discrete Anamorphic Stretch Transform (DAST) is one form of anamorphic transform emulating propagation of electromagnetic waves through a diffractive medium with a dielectric function that has warped dispersive (frequency dependent) property.

The present disclosure refers to this edge detection method as a Phase Stretch Transform (PST). PST can be described in both the frequency domain and the spatial domain as presented below.

2.1. Technical Description

Figure 31:
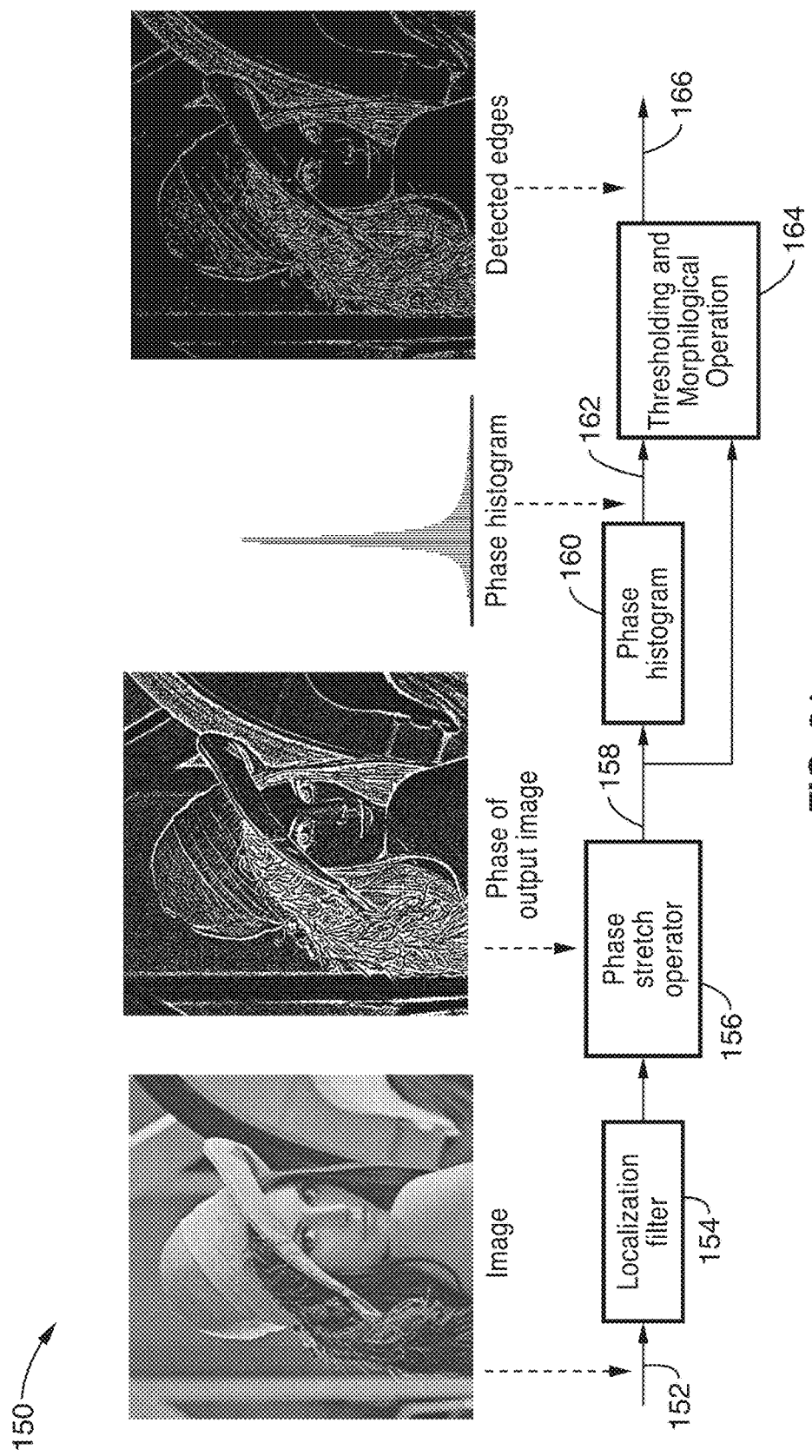
FIG. 31 is a block diagram of performing object and shape detection utilizing a phase stretch transform (PST) according to an embodiment of the present disclosure.

FIG. 31 illustrates an example embodiment 150 for performing edge detection using a phase stretch transformation. In this method, the original image 152 is first smoothed using a localization kernel (filter) 154, and then is passed through a nonlinear frequency dependent phase operation (phase stretch) 156. The phase of the output complex image 158 is used for edge detection. The resulting phase profile has both positive and negative values. In a post processing stage for edge detection, the negative values are set to zero in this example. The histogram 160 of the phase profile is determined to find the threshold 162 for edge detection. After thresholding, the binary image is further processed by morphological operations 164, to generate an image of detected edges 166.

2.1.1. Operation in Frequency Domain

The image under analysis is represented by B[n,m] where n and m are two dimensional spatial variables. The PST in the frequency domain can be described as follows:

$$A[n,m] = \measuredangle \left\langle \mathrm{IFFT}\{\tilde{K}[p,q] \cdot \tilde{L}[p,q] \cdot \mathrm{FFT2}\{B[n,m]\}\} \right\rangle \quad (7)$$

where A [n, m] is the output phase image, $\measuredangle \langle \; \rangle$ is the angle operator, FFT2 is the two dimensional Fast Fourier Transform, (FFT2 is the two dimensional Inverse Fast Fourier Transform and p and q are two dimensional frequency variables. $\tilde{L}[p,q]$ is the frequency response of the localization kernel and the warped phase kernel $\tilde{K}[p,q]$ describes a nonlinear frequency dependent phase:

$$\tilde{K}[p,q] = e^{j \cdot \varphi[p,q]} \quad (8)$$

For edge detection applications the derivative of frequency-dependent phase $\varphi[p,q]$, called phase derivative PD[p, q] should have a sub-linear function with respect to p and q frequency variables. Phase derivative is also known as group delay in analogy to the same parameter applied to temporal signals. A simplest (e.g., represented by least number of parameters) profiles is the inverse tangent function:

$$PD[p,q] = a_1 \cdot \tan^{-1}(b_1 \cdot p) + a_2 \cdot \tan^{-1}(b_2 \cdot p), \quad (9)$$

where $\tan^{-1}(\;)$ is the inverse tangent function and $a_1$, $b_1$, $a_2$, $b_2$, are real-valued numbers. The total amount of phase $\varphi[p,q]$ and the slope of the phase derivative profile at p=q=0 along with the width of the localization kernel determine the sharpness of the image edges that will be extracted.

Application of PST to the image creates the phase image A[n,m] which is further post processed. For edge detection, post-processing includes generating the histogram of phase image A [n, m], cutting the negative phase values, and optionally performing thresholding and morphological operations. The histogram shows the density of different edges on which thresholding is applied. Thresholding is used to distinguish between various edges, e.g., softer or sharper edges. Morphological operations can be used if needed to thin the edges, clean the phase image by removing the isolated pixels, or to find prime lines representing edges.

2.1.2. Operation in Spatial Domain

The PST described in Eq. (7) can be also described in the spatial domain as follows:

$$A[n,m] = \measuredangle \left\langle \sum_{j_1,j_2=-\infty}^{\infty} \sum_{k_1,k_2=-\infty}^{\infty} K[n-j_1, m-j_2] \cdot L[j_1-k_1, j_2-k_2] \cdot B[k_1,k_2] \right\rangle \quad (10)$$

where the warped phase kernel in spatial domain, K[n,m] is described by a nonlinear phase operation, $$K[n,m] = e^{j \cdot \Phi[n,m]} \quad (11)$$

and is the Fourier transform of the frequency phase kernel $\tilde{K}[p,q]$. For edge detection applications the derivative of phase profile $\Phi[n,m]$, called Local Frequency LF[n,m], should have a super-linear profile with respect to the spatial coordinates n and m. A simple (e.g., least number of parameters) profile is the tangent function:

$$LF[n,m] = c_1 \cdot \tan(d_1 \cdot n) + c_2 \cdot \tan(d_2 \cdot m), \quad (12)$$

where tan( ) is the tangent function and $c_1$, $d_1$, $c_2$ and $d_2$ are real-valued numbers.

2.1.3. Designing the Phase Kernel for Edge Detection

The parameters utilized in this embodiment for the disclosed edge detection methods are:

(1) $\{a_1, b_1, a_2, b_2\}$: parameters of the warped phase kernel;

(2) $\Delta f$: bandwidth of the localization kernel; and (3) Thresh: threshold value.

In FIG. 6A and FIG. 6B as previously described, a typical phase derivative and phase profile for the phase kernel $\tilde{K}[p,q]$ is illustrated that results in edge detection. The parameters of the plot are normalized.

The kernel applies a phase that increases with spatial displacement. Since edges contain high frequencies, they are assigned a larger phase and are then spatially highlighted in the phase of the transformed image. Parameters of the kernel ($a_1 b_1$ and $a_2 b_2$) control this process. There exists a tradeoff between resolution and SNR. A larger phase results in better SNR but at the expense of resolution. Also a higher slope of the phase derivative at the origin results in a sharper edges but it also increases the noise. These parameters can be adjusted manually or optimized iteratively. They can be globally fixed or locally optimized.

Frequency bandwidth or spatial length of the localization kernel is designed to reduce the noise in the edge detection algorithm but not to remove vital edge information. The threshold value is designed using the histogram of the phase image after the transform. Dependent on the application the threshold can be set to allow more or less edges to be shown in the binary edge image.

2.2. Experimental Results

In this section, examples of detection using the disclosed PST method are described. For qualitative benchmarking, results are also shown of edge detection using Canny and Sobel methods. The normalized phase kernel profile and its derivative shape used for the examples presented in this disclosure were previously shown in FIG. 6A and FIG. 6B.

Figure 32A:
FIG. 32A through FIG. 32D are images (Lena) depicting comparisons between the Canny method compared and edge detection according to an embodiment of the present disclosure, shown with two different thresholds and sigma values.
Figure 32B:
Figure 32C:
Figure 32D:

FIG. 32A through FIG. 32D depict a comparison between Canny and the disclosed PST edge detection method as a first performance example. The image under analysis is a gray scale Lena image with 512×512 pixels in TIFF format. In FIG. 32A and FIG. 32B threshold values of 0.09 and 0.15, respectively, for edge detection using the Canny method having a sigma value of 0.02. In this case a low sigma value was chosen to enhance the spatial resolution, and two different high threshold values were selected to illustrate the impact of this parameter (the low threshold values is 25% of the high value by default). For edge detection using the disclosed method a phase kernel has been utilized as shown in Eq. (9) with $a_1=a_2=5.8182\times10^{-7}$ and $b_1=b_2=0.6148$. When the disclosed method is combined with a localization kernel with parameter $\Delta f=0.8$ and a threshold value of 0.025 utilized the results are shown in FIG. 32C. It should be appreciated that morphological operations used to arrive at the result shown in FIG. 32C include edge thinning and isolated pixel removing. To analyze the effect of localization kernel and thresholding value, edge detection using $\Delta f=0.4$ and threshold value of 0.03 has also been shown in FIG. 32D. As evident in these figures some edges are more properly extracted using the disclosed method than when using the Canny edge detector. Also a comparison of FIG. 32C and FIG. 32D illustrates that by changing the localization kernel width and threshold values, edges with different strengths can be extracted.

Figure 33A:
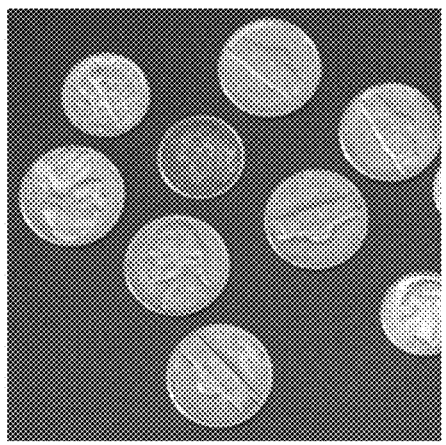
FIG. 33A through FIG. 33D are images (coins) depicting comparisons between the Canny method compared and edge detection according to an embodiment of the present disclosure, shown with two different thresholds and sigma value.
Figure 33B:
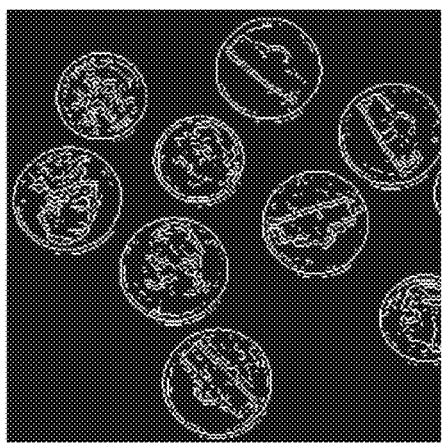
Figure 33C:
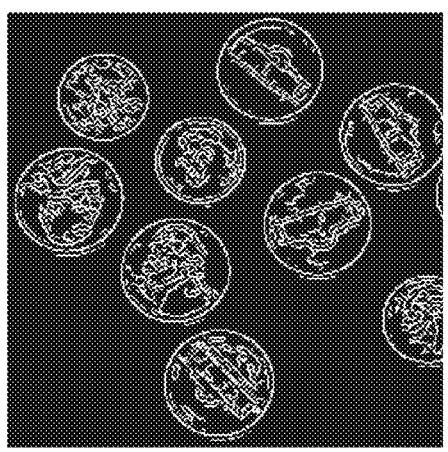
Figure 33D:
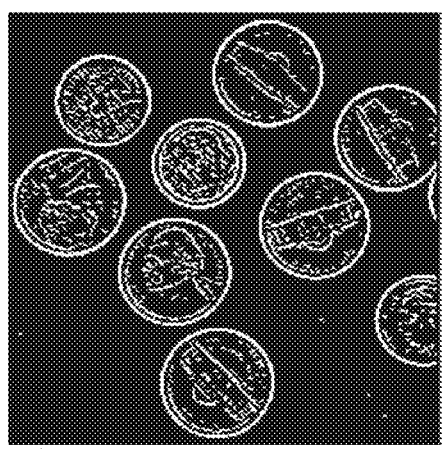

FIG. 33A through FIG. 33D illustrate a comparison between an original image of coins and different edge detection methods. The image utilized for this comparative analysis is a gray scale image of coins with 246×246 pixels in a TIFF format as seen in an original image in FIG. 33A. Results of edge detection in three cases are shown, Sobel with a threshold value of 0.042 is seen in FIG. 33B, Canny with signal value of 0.02 and threshold value of 0.017 is seen in FIG. 33C, and the disclosed method is seen in FIG. 33D. For edge detection using the disclosed method a phase kernel has been used as shown in Eq. (9) with $a_1=a_2=1.3375\times10^{-9}$ and $b_1=b_2=1.2823$, localization kernel parameter $\Delta f=1.6$ and threshold value of 0.03. The figures confirm that the disclosed method has a high resolution and accuracy for finding the edges compared to Sobel and Canny methods.

Finally the disclosed PST method is analyzed for edge detection on images taken in low contrast environment. In these situations edge detection is challenging because the image has low contrast which reduces the signal to noise ratio of edge detection methods.

Figure 34A:
FIG. 34A through FIG. 34D are images (rocky beach) depicting a normal (un-zoomed condition) and images in response to zooming with edge detections performed according to an embodiment of the present disclosure.
Figure 34B:
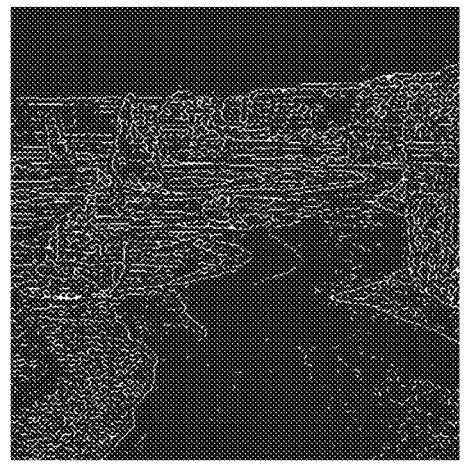
Figure 34C:
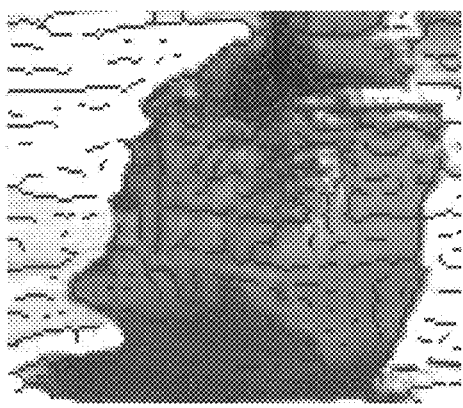
Figure 34D:

FIG. 34A through FIG. 34D illustrate comparison of zooming in edge detection. In FIG. 34A is an original gray scale image of a rocky beach scene with 512×512 pixels in a TIFF image format. Result of edge detection using the disclosed method is shown in FIG. 34B, using a phase kernel described in Eq. (9) with $a_1=a_2=11.6364$ and $b_1=b_2=0.6148$, localization kernel parameter $\Delta f=20$ and threshold value of 0.015. For better illustration, an overlay of the original image has been shown with the detected edge in two sections of the original image with low contrast areas delineated with boxes 1 and 2 in FIG. 34A. Results are shown in FIG. 34C and FIG. 34D. For better comparison, in the overlay images the original image brightness has been multiplied by two. As illustrated in this example the disclosed method has found the edges accurately in the low contrast part of the image.

The enhancements described in the presented technologies above can be readily implemented within various image processing systems, which include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in each of the diagrams for the sake of simplicity of illustration, while one of ordinary skill in the art recognizes the use of computer devices for carrying out steps involved with image/video processing and output. The presented technology is non-limiting with regard to memory and computer-readable media, insofar as these are non-transitory, and thus not constituting a transitory electronic signal.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. A method of performing edge detection on a digital image, comprising: (a) receiving a digital image within an image processing device; (b) applying a nonlinear frequency dependent phase operation to the digital image; (c) applying a phase kernel during said phase operation so that total amount of phase applied in said phase kernel determines sharpness of image edges being extracted from the digital image; (d) wherein edge detection is based on phase within a complex image after application of the phase kernel from said nonlinear frequency dependent phase operation; and (e) generating an image output as a phase image output with phase of the transformed image as output.

2. The method of any preceding embodiment, applying said nonlinear frequency dependent phase operation as a phase transformation, which is applied in either a frequency domain or a spatial domain, to the received digital image.

3. The method of any preceding embodiment, wherein said phase transformation is applied in the frequency domain comprising performing a transformation of the received digital image to the frequency domain utilizing a phase kernel, and followed by performing an inverse transform to generate a phase image in the spatial domain.

4. The method of any preceding embodiment, further comprising performing said phase transformation in the spatial domain by application of a local frequency, as a phase derivative with respect to spatial coordinates.

5. The method of any preceding embodiment, wherein said phase transformation is applied in the spatial domain in response to convolving with a spatial phase kernel.

6. The method of any preceding embodiment, wherein said phase transformation is performed utilizing a transform selected from the group of transforms consisting of Fourier Transform, Fast Fourier Transform (FFT), Discrete Fourier Transform (DFT), Discrete Sine Transform (DST) and Discrete Cosine transforms (DCT).

7. The method of any preceding embodiment, further comprising applying said nonlinear frequency dependent phase operation as a phase stretch transformation, which is applied in either a frequency domain or a spatial domain, to the digital image.

8. The method of any preceding embodiment, further comprising applying a localization kernel prior to said phase stretch transformation.

9. The method of any preceding embodiment, further comprising setting negative values in said generated complex phase image to zero.

10. A method of performing edge detection on a digital image, comprising: (a) receiving a digital image within an image processing device; (b) applying a nonlinear frequency dependent phase operation as a phase transformation, applied in a frequency domain, to the digital image; (c) applying a phase kernel during said phase transformation in which total amount of phase applied in said phase kernel determines sharpness of image edges being extracted from the digital image; (d) wherein edge detection is based on phase within a complex image after application of the phase kernel from said nonlinear frequency dependent phase operation; and (e) generating an image output as a phase image with phase of the transformed image as output.

11. The method of any preceding embodiment, wherein said phase transformation is applied in the frequency domain comprising performing a transformation of the input image to the frequency domain utilizing a phase kernel, and followed by performing an inverse transform to generate a phase image in the spatial domain.

12. A method of performing edge detection on a digital image, comprising: (a) receiving a digital image within an image processing device; (b) applying a nonlinear frequency dependent phase operation, as a phase transformation in the spatial domain, to the digital image; (c) applying a phase kernel during said phase operation in response to convolving with a spatial phase kernel so that total amount of phase applied in said phase kernel determines sharpness of image edges being extracted from the digital image; (d) wherein edge detection is based on phase within a complex image from said nonlinear frequency dependent phase operation; and (e) generating an image output as a phase image with phase of the transformed image as output.

13. The method of any preceding embodiment, further comprising post processing comprising separating the phase of the transformed image into two subranges.

14. The method of any preceding embodiment, further comprising post processing comprising separating the phase of the transformed image into multiple subranges.

15. The method of any preceding embodiment, wherein said subranges comprise at least one subrange higher than the peak of a phase histogram, and at least one subrange lower than the peak of a phase histogram.

16. The method of any preceding embodiment, further comprising thresholding applied during post processing, wherein said thresholding further selects specific ranges of phase values in creating said phase image output.

17. The method of any preceding embodiment, further comprising thresholding configured for applying at least one threshold level to the phase image.

18. The method of any preceding embodiment, further comprising morphological operations performed during post processing to enhance phase image output.

19. The method of any preceding embodiment, further comprising post processing of the phase image output by generating a histogram of phase image to which thresholding is applied prior to one or more morphological image operations.

20. The method of any preceding embodiment, further comprising distinguishing between different kinds of edges during said thresholding, including distinguishing between edges that are either softer or sharper.

21. The method of any preceding embodiment, further comprising performing morphological operations on said phase image output, wherein said morphological operations are selected from the group of morphological operations consisting of thinning the edges, cleaning a phase image by removing isolated pixels, finding prime lines representing edges, or finding image corners as points of interest, and combinations thereof.

22. The method of any preceding embodiment, wherein said phase kernel is configured with a phase profile that is an even function of frequency.

23. The method of any preceding embodiment, wherein said phase profile comprises a quadratic profile.

24. The method of any preceding embodiment, further comprising applying said method within a numerical phase-imaging microscope.

25. The method of any preceding embodiment, further comprising decomposing a received digital image to its constituent colors prior to performing said nonlinear frequency dependent phase operation.

26. The method of any preceding embodiment, further comprising applying said frequency dependent phase operation to each of the constituent colors to generate a phase image output for each color.

27. The method of any preceding embodiment, further comprising displaying generated phase image output for each color either separately, or in combination with one another.

28. The method of any preceding embodiment, further comprising performing a pre-filtering step prior to performing said nonlinear frequency dependent phase operation.

29. The method of any preceding embodiment, further comprising applying said pre-filtering by utilizing at least one linear filter, or at least one non-linear filter, or a combination of at least one linear and non-linear filter, wherein said linear and/or non-linear filters are selected as having a desired frequency response.

30. The method of any preceding embodiment, further comprising applying a minimum intensity trigger on the received digital image to remove low intensity pixels and to improve signal to noise ratio.

31. The method of any preceding embodiment, further comprising applying a morphological operation to said phase image output, wherein said morphological operation is configured for finding and discarding isolated pixels and identifying and maintaining continuous lines and curves.

32. The method of any preceding embodiment, further comprising establishing a user selected scale for the phase image output, as based on user input.

33. The method of any preceding embodiment, further comprising automatically updating the operations leading up to generation of a phase image output, including nonlinear frequency dependent phase operation, based on said user establishing a scale for the phase image output, as based on user input of a user selected scale.

34. The method of any preceding embodiment, wherein said received image data comprises either real-valued, or complex-valued, image data.

35. The method of any preceding embodiment, wherein said phase image output comprises complex-valued image data.

36. The method of any preceding embodiment, wherein said complex-valued image data includes amplitude and phase.

37. The method of any preceding embodiment, further comprising utilizing said phase from said complex-valued image data for performing object detection, or tracking, or motion estimation, or edge detection, or any combination of object detection, tracking, motion estimation, or edge detection.

38. The method of any preceding embodiment, wherein said nonlinear frequency dependent phase operation is performed in response to operating on said received image data with a mixer in combination with a local oscillator having a warped, non-linear, chirp.

39. The method of any preceding embodiment, further comprising performing a morphological operation of non-maximum suppression on said phase image output.

40. The method of any preceding embodiment, further comprising performing a morphological operation of Hysteresis thresholding on said phase image output for rejecting isolated artifacts to prevent them from being recognized as edges.

41. The method of any preceding embodiment, further comprising performing a post-processing operation of Scale Invariant Feature Transform (SIFT).

42. The method of any preceding embodiment, wherein said method of performing edge detection on a digital image is configured for generating two-dimensional (2D), or three-dimensional (3D) phase image output.

43. The method of any preceding embodiment, wherein three-dimensional (3D) phase image output, comprises applying edge detection to individual 2D frames of received image data, which are cross-sections of a 3D object, and then reconstructing these 2D cross-sections into a 3D phase image output.

44. The method of any preceding embodiment, wherein said method of performing edge detection on a digital image is configured for being utilized for image processing selected from the group of image processing functions consisting of: (a) image enhancement, (b) edge and corner detection, (c) object, shape, pattern and texture detection and recognition, (d) tracking and motion estimation, (e) 2D or 3D still or video image processing, (f) real-time sensing, (g) visual accommodation, (h) rendering and perception, (i) computer vision and machine learning, (j) tissue diagnostics in digital pathology and radiology, and (k) imaging through fog and other diffusive media.

45. An apparatus for performing edge detection on a digital image, comprising: (a) at least one processor; (b) memory storing instructions; (c) said instructions when executed by the processor performing steps comprising: (c)(i) receiving a digital image for image processing; (c)(ii) applying a nonlinear frequency dependent phase operation to the digital image; and (c)(iii) applying a phase kernel during said phase operation so that total amount of phase applied in said phase kernel determines sharpness of image edges being extracted from the digital image; (c)(iv) wherein edge detection is based on phase within a complex image from said nonlinear frequency dependent phase operation; and (c)(v) generating an image output as a phase image with phase of the transformed image as output.

46. The apparatus of any preceding embodiment, wherein said nonlinear frequency dependent phase operation comprises a phase transformation applied in either a frequency domain or a spatial domain, to the digital image.

47. The apparatus of any preceding embodiment, wherein said phase transformation is applied in a frequency domain comprising instructions when executed by the processor for performing a transformation of the input image to the frequency domain utilizing a phase kernel, and followed by performing an inverse transform to generate a phase image in the spatial domain.

48. The apparatus of any preceding embodiment, wherein said phase transformation is applied in the spatial domain by instructions that when executed by the processor apply a local frequency as a phase derivative with respect to spatial coordinates.

49. The apparatus of any preceding embodiment, wherein said instructions when executed by the processor are configured for applying said phase transformation in the spatial domain in response to convolving with a spatial phase kernel.

50. The apparatus of any preceding embodiment, wherein said instructions when executed by the processor perform said phase transformation utilizing a transform selected from the group of transforms consisting of Fourier Transform, Fast Fourier Transform (FFT), Discrete Fourier Transform (DFT), Discrete Sine Transform (DST) and Discrete Cosine transforms (DCT).

51. The apparatus of any preceding embodiment, wherein said instructions when executed by the processor are configured for performing said nonlinear frequency dependent phase operation as a phase stretch transformation, which is applied in either a frequency domain or a spatial domain, to the received digital image.

52. The apparatus of any preceding embodiment, further comprising instructions that when executed by the processor are configured for applying a localization kernel prior to said phase stretch transformation.

53. The apparatus of any preceding embodiment, further comprising instructions that when executed by the processor are configured for setting negative values in said generated complex phase image to zero.

54. An image processing method, comprising: (a) applying a phase transformation to an input image; and (b) using the phase of the transformed image as the output.

55. The method of any preceding embodiment, wherein the method is used for image enhancement, or for edge and corner detection, or for object detection and tracking, or for machine learning, or for artistic special effects, or any combination of the foregoing.

56. A method for processing an image, comprising: (a) applying a phase transform to the image spectrum in the spectral domain; and (b) using the phase of the image in the spatial domain as the output.

57. The method of any preceding embodiment, wherein said phase transform in the spectral domain is described by application of a phase derivative, defined as phase derivative with respect to spatial frequency, that is a nonlinear function of frequency.

58. The method of any preceding embodiment, wherein said phase transform is described by application of a phase derivative, defined as phase derivative with respect to spatial frequency, that is a sublinear function of frequency.

59. The method of any preceding embodiment, wherein said phase transform is described by application of a phase derivative, defined as phase derivative with respect to to spatial frequency, that is a sublinear function of frequency.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of performing edge detection on a digital image, comprising:
    receiving a digital image within an image processing device;
    applying a localization kernel prior to a nonlinear frequency dependent phase operation;
    applying the nonlinear frequency dependent phase operation to the digital image in either a frequency domain or a spatial domain;
    applying a phase kernel during said phase operation so that total amount of phase applied in said phase kernel determines sharpness of image edges being extracted from the digital image;
    wherein edge detection is based on phase within a complex image after application of the phase kernel from said nonlinear frequency dependent phase operation; and
    generating an image output as a phase image output with phase of the transformed image as output.

2. The method as recited in claim 1, applying said nonlinear frequency dependent phase operation as a phase transformation, which is applied in either a frequency domain or a spatial domain, to the received digital image.

3. The method as recited in claim 2, wherein said phase transformation is applied in the frequency domain comprising performing a transformation of the received digital image to the frequency domain utilizing a phase kernel, and followed by performing an inverse transform to generate a phase image in the spatial domain.

4. The method as recited in claim 2, further comprising performing said phase transformation in the spatial domain by application of a local frequency, as a phase derivative with respect to spatial coordinates.

5. The method as recited in claim 2, wherein said phase transformation is applied in the spatial domain in response to convolving with a spatial phase kernel.

6. The method as recited in claim 2, wherein said phase transformation is performed utilizing a transform selected from the group of transforms consisting of Fourier Transform, Fast Fourier Transform (FFT), Discrete Fourier Transform (DFT), Discrete Sine Transform (DST) and Discrete Cosine transforms (DCT).

7. The method as recited in claim 1, further comprising setting negative values in said generated complex phase image to zero.

8. A method of performing edge detection on a digital image, comprising:
    receiving a digital image within an image processing device;
    applying a localization kernel prior to a nonlinear frequency dependent phase operation;
    applying the nonlinear frequency dependent phase operation as a phase transformation, applied in a frequency domain, to the digital image;
    applying a phase kernel during said phase transformation in which total amount of phase applied in said phase kernel determines sharpness of image edges being extracted from the digital image;
    wherein edge detection is based on phase within a complex image after application of the phase kernel from said nonlinear frequency dependent phase operation; and
    generating an image output as a phase image with phase of the transformed image as output.

9. The method as recited in claim 8, wherein said phase transformation is applied in the frequency domain comprising performing a transformation of the input image to the frequency domain utilizing a phase kernel, and followed by performing an inverse transform to generate a phase image in the spatial domain.

10. A method of performing edge detection on a digital image, comprising:
    receiving a digital image within an image processing device;
    applying a localization kernel prior to a nonlinear frequency dependent phase operation
    applying the nonlinear frequency dependent phase operation, as a phase transformation in the spatial domain, to the digital image;
    applying a phase kernel during said phase operation in response to convolving with a spatial phase kernel so that total amount of phase applied in said phase kernel determines sharpness of image edges being extracted from the digital image;
    wherein edge detection is based on phase within a complex image from said nonlinear frequency dependent phase operation; and generating an image output as a phase image with phase of the transformed image as output.

\* \* \* \* \*